(12) United States Patent
Brown et al.

(10) Patent No.: US 11,771,283 B2
(45) Date of Patent: Oct. 3, 2023

(54) METHOD AND SYSTEM FOR MANUAL CONTROL OF AUTONOMOUS FLOOR CLEANER

(71) Applicant: BISSELL Inc., Grand Rapids, MI (US)

(72) Inventors: Adam Brown, Holland, MI (US); Eric D. Buehler, Grand Rapids, MI (US); Derek E. Smith, Grand Rapids, MI (US); David VanKampen, Grand Rapids, MI (US)

(73) Assignee: BISSELL, Inc., Grand Rapids, MI (US)

( * ) Notice: Subject to any disclaimer, the term of this patent is extended or adjusted under 35 U.S.C. 154(b) by 116 days.

(21) Appl. No.: 16/211,323

(22) Filed: Dec. 6, 2018

(65) Prior Publication Data

US 2019/0167059 A1 Jun. 6, 2019

Related U.S. Application Data

(60) Provisional application No. 62/595,313, filed on Dec. 6, 2017.

(51) Int. Cl.
*A47L 9/28* (2006.01)
*A47L 5/00* (2006.01)
(Continued)

(52) U.S. Cl.
CPC .............. *A47L 9/2857* (2013.01); *A47L 5/00* (2013.01); *A47L 9/0411* (2013.01); *A47L 9/2805* (2013.01); *A47L 9/2826* (2013.01); *A47L 9/2842* (2013.01); *A47L 9/2852* (2013.01); *A47L 9/2894* (2013.01); *G05B 19/416* (2013.01); *G05D 1/00* (2013.01);
(Continued)

(58) Field of Classification Search
CPC .... A47L 2201/04; A47L 2201/06; A47L 5/00; A47L 9/0411; A47L 9/2805; A47L 9/2826; A47L 9/2842; A47L 9/2852; A47L 9/2857; A47L 9/2894; G05B 19/416; G05B 2219/45098; G05D 1/00; G05D 1/0016; G05D 1/0033; G05D 2201/0203
See application file for complete search history.

(56) References Cited

U.S. PATENT DOCUMENTS 6,457,206 B1   10/2002   Judson
8,843,245 B2 *  9/2014   Choe .................... G05D 1/0246
                                                            701/2

(Continued)

OTHER PUBLICATIONS

Sousa et al. ("Using Accelerometers to Command a Cleaning Service Robot", University of Poro, Portugal, published Oct. 12, 2009). (Year: 2009).*

(Continued)

*Primary Examiner* — Duy Vu N Deo
*Assistant Examiner* — Christopher Remavege
(74) *Attorney, Agent, or Firm* — Warner Norcross + Judd LLP

(57) ABSTRACT

A system and method for selectively manually controlling an autonomous floor cleaner includes an autonomous floor cleaner and a remote control device, such as a smartphone. The smartphone can have a downloaded application for controlling one or more functions of the cleaning robot, including manually directing the movement of the cleaning robot.

20 Claims, 16 Drawing Sheets

(51) Int. Cl.
*A47L 9/04* (2006.01)
*G05B 19/416* (2006.01)
*G05D 1/00* (2006.01)

(52) U.S. Cl.
CPC ......... *G05D 1/0016* (2013.01); *G05D 1/0033* (2013.01); *A47L 2201/04* (2013.01); *A47L 2201/06* (2013.01); *G05B 2219/45098* (2013.01); *G05D 2201/0203* (2013.01)

(56) References Cited

U.S. PATENT DOCUMENTS

| | | | | |
|---|---|---|---|---|
| 8,903,568 | B1* | 12/2014 | Wang | G05D 1/0016 |
| | | | | 701/2 |
| 9,008,835 | B2 | 4/2015 | Dubrovsky et al. | |
| 9,221,170 | B2 | 12/2015 | Barajas | |
| 9,734,704 | B2 | 8/2017 | Lee | |
| 9,891,621 | B2* | 2/2018 | Bachrach | B64D 47/08 |
| 10,291,765 | B2* | 5/2019 | So | H04Q 9/00 |
| 10,368,378 | B2* | 7/2019 | Foster | G01C 21/20 |
| 10,429,835 | B2 | 10/2019 | Tang | |
| 2008/0192005 | A1* | 8/2008 | Elgoyhen | G06F 3/014 |
| | | | | 345/158 |
| 2011/0264305 | A1* | 10/2011 | Choe | G05D 1/0274 |
| | | | | 701/2 |
| 2012/0313847 | A1* | 12/2012 | Boda | G06F 3/017 |
| | | | | 345/156 |
| 2013/0138246 | A1* | 5/2013 | Gutmann | G05D 1/0231 |
| | | | | 700/253 |
| 2016/0274762 | A1* | 9/2016 | Lopez | G06T 19/006 |
| 2016/0327950 | A1* | 11/2016 | Bachrach | G06F 3/00 |
| 2016/0374526 | A1* | 12/2016 | Yang | A47L 11/4011 |
| | | | | 701/23 |
| 2017/0079497 | A1* | 3/2017 | Kim | G06T 7/73 |
| 2017/0201617 | A1* | 7/2017 | So | H04Q 9/00 |
| 2017/0315547 | A1* | 11/2017 | Tsaplin | H04N 5/23206 |
| 2017/0329324 | A1* | 11/2017 | Bachrach | B64C 39/024 |
| 2018/0188723 | A1* | 7/2018 | Lee | G05D 1/0094 |
| 2018/0244385 | A1* | 8/2018 | Kim | G05D 1/085 |
| 2018/0373242 | A1* | 12/2018 | Han | A47L 11/4011 |
| 2019/0056725 | A1* | 2/2019 | Su | G06F 3/04883 |
| 2019/0137993 | A1* | 5/2019 | Bertrand | G06F 1/1694 |

OTHER PUBLICATIONS

"Mobile Robot Kinematics." part of the course materials for SI475, a course in Intelligent Robotics taught at the US Naval Academy by Prof. Frederick Crabbe, available online at least as early as Jan. 17, 2009.

"Using Accelerometers to Command a Cleaning Service Robot," Armando Sousa and Louis Paulo Reis, published Oct. 12, 2009.

* cited by examiner

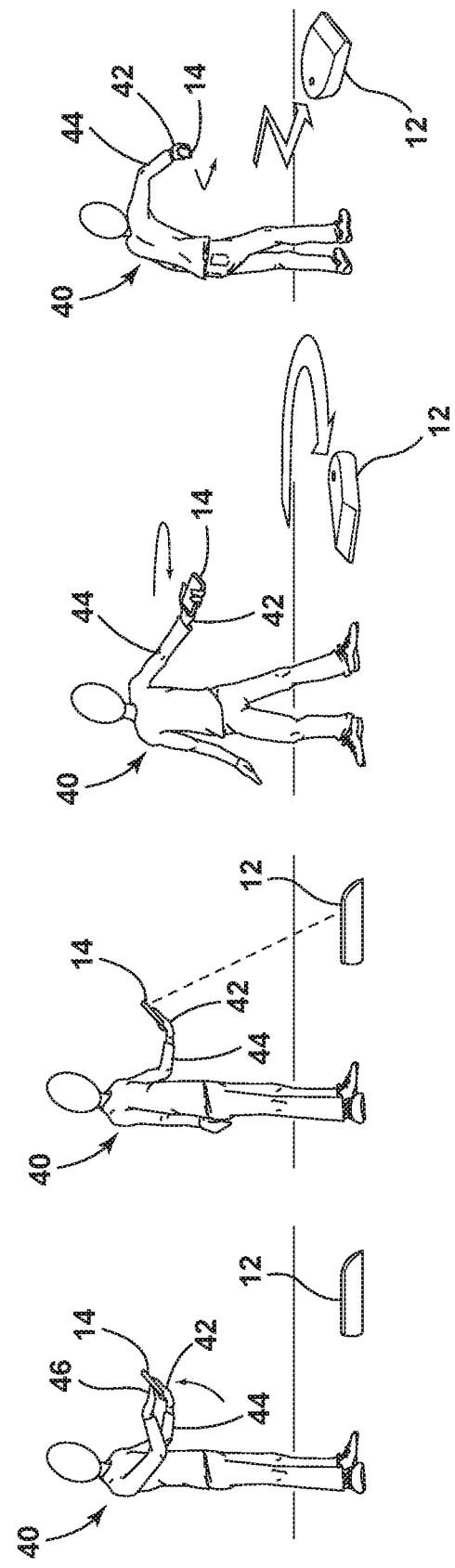

METHOD AND SYSTEM FOR MANUAL CONTROL OF AUTONOMOUS FLOOR CLEANER

CROSS-REFERENCE TO RELATED APPLICATION(S)

The present application claims the benefit of U.S. Provisional Patent Application No. 62/595,313, filed Dec. 6, 2017, which is incorporated herein by reference in its entirety.

BACKGROUND

Autonomous or robotic floor cleaners can move without the assistance of a user or operator to clean a floor surface. For example, the floor cleaner can be configured to sweep dirt (including dust, hair, and other debris) into a collection bin carried on the floor cleaner and/or to sweep dirt using a cloth which collects the dirt. The floor cleaner can move randomly about a surface while cleaning the floor surface or use a mapping/navigation system for guided navigation about the surface. Some floor cleaners are further configured to apply and extract liquid for deep cleaning carpets, rugs, and other floor surfaces.

Typical robotic floor cleaners operate more or less autonomously, i.e. with little or no user control input or supervision required. Some provisions have been made for selective manual control of robotic floor cleaners to move the robotic floor cleaner under user supervision. Prior robotic floor cleaners have relied on remote user input introduced through physical buttons, a keyboard, a mouse, or a joystick. Other prior robotic floor cleaners are responsive to user gestures, but these systems have lacked control precision and accuracy, and are often not intuitive to the user.

BRIEF SUMMARY

According to one aspect of the invention, a method for manually controlling an autonomous floor cleaner is provided. The method can include wirelessly connecting a smartphone to an autonomous floor cleaner, detecting a touch on a touchscreen display of the smartphone, fixing the relative position of the autonomous floor cleaner with respect to the smartphone and activating the suction source of the autonomous floor cleaner upon the detection of the touch, detecting acceleration of the smartphone representing a gesture by a user holding the smartphone, transforming the detected acceleration of the smartphone into movement instructions, and executing the movement instructions by a controller of the autonomous floor cleaner to control a drive system of the autonomous floor cleaner and move the autonomous floor cleaner over the floor surface based on the movement instructions, while maintaining the fixed the relative position of the autonomous floor cleaner with respect to the smartphone.

According to another aspect of the invention, a system for manually cleaning a floor surface with an autonomous floor cleaner is provided. The system can include an autonomous floor cleaner and a smartphone. The autonomous floor cleaner can include an autonomously moveable housing, a controller carried by the housing, a drive system, and an airflow path through the autonomously moveable housing comprising an air inlet and an air outlet, a suction nozzle positioned to confront a floor surface and defining the air inlet, a collection chamber, and a suction source for generating a working air stream through the airflow path. The smartphone can include an inertial measurement unit adapted to detect acceleration of the smartphone, a touchscreen adapted to display at least one virtual button adapted to fix the relative position of the autonomous floor cleaner with respect to the smartphone, and a processor comprising an executable algorithm/software code for transforming the detected acceleration of the smartphone into movement instructions executable by the controller of the autonomous floor cleaner while maintaining the fixed the relative position of the autonomous floor cleaner with respect to the smartphone.

BRIEF DESCRIPTION OF THE DRAWINGS

The invention will now be described with respect to the drawings in which:

FIGS. 2A-2D are schematic illustrations of the system of FIG. 1 in use;

DESCRIPTION OF EMBODIMENTS OF THE INVENTION

The invention relates to autonomous floor cleaners for cleaning floor surfaces, including bare floors, carpets and rugs. More specifically, the invention relates to systems and methods for selectively manually controlling an autonomous floor cleaner.

Figure 1:
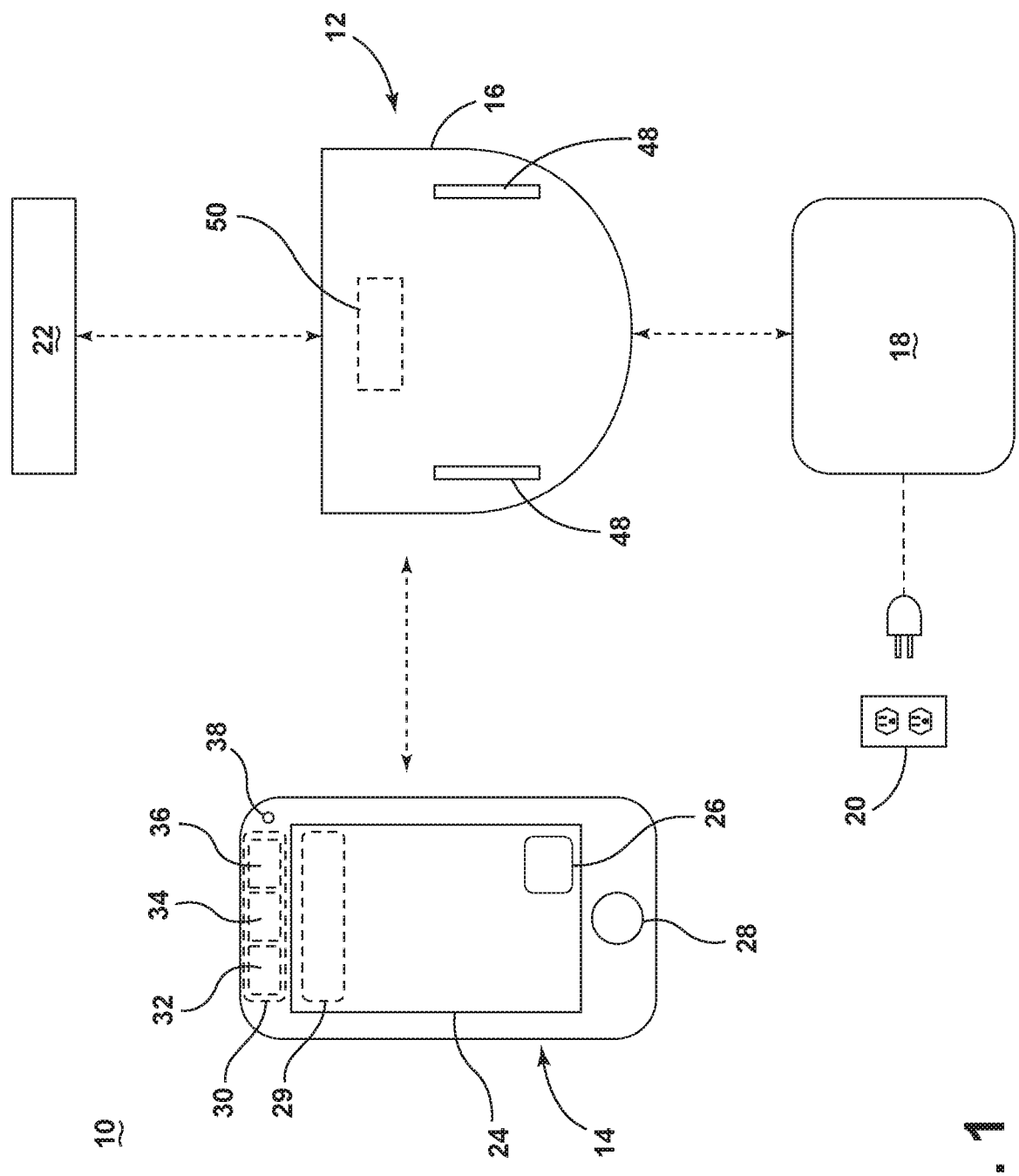
FIG. 1 is a schematic view of a system for selectively manually controlling an autonomous floor cleaner according to one embodiment of the invention.

FIG. 1 is a schematic view of a system 10 for selectively manually controlling an autonomous floor cleaner according to one embodiment of the invention. The system 10 includes an autonomous floor cleaner or cleaning robot 12 and a remote control device 14, such as a smartphone. As used herein, the term smartphone includes a mobile phone that performs many of the functions of a computer, typically having a touchscreen interface, Internet access, and an operating system capable of running downloaded applications. While embodiments of the system 10 are discussed herein relative to a smartphone providing the remote control device 14 for the robot 12, it is understood that other portable mobile devices are suitable, such as but not limited to, a tablet, a wearable computer such as a smartwatch or a dedicated remote control device.

In one embodiment, the cleaning robot 12 wirelessly connects to the smartphone 14, and the smartphone 14 acts as a proxy for a handle found on non-autonomous floor cleaners, i.e. a virtual handle, as described in further detail below.

The cleaning robot 12 mounts the components of various functional systems of the robot in an autonomously moveable unit or housing 16. In one embodiment, the cleaning robot 12 can be a dry vacuuming robot, and includes at least a vacuum collection system for creating a partial vacuum to suck up debris (which may include dirt, dust, soil, hair, and other debris) from a surface to be cleaned, such as a floor surface, and collecting the removed debris in a space provided on the robot for later disposal. In another embodiment, the cleaning robot 12 can be a deep cleaning robot, and includes at least a fluid supply system for storing cleaning fluid and delivering the cleaning fluid to the surface to be cleaned, a fluid recovery system for removing the cleaning fluid and debris from the surface to be cleaned and storing the recovered cleaning fluid and debris. Other functional systems for the cleaning robot 12 are also possible, such as an apparatus configured to deliver steam.

The system 10 may also include a docking station 18 for the robot 12. The docking station 18 is configured to recharge the robot 12. The docking station 18 can be connected to a household power supply, such as a wall outlet 20, and can include a converter for converting the AC voltage into DC voltage for recharging a power supply onboard the robot 12. The docking station 18 can also include various sensors and emitters for monitoring robot status, enabling auto-docking functionality, communicating with each robot, as well as features for network and/or Bluetooth connectivity. The docking station 18 may have other functionality as well; in the case of a deep cleaning robot, the docking station 18 can be configured to automatically refill a solution tank of the robot 12 with fresh water and empty a recovery tank of the robot 12. Optionally, the system 10 can include an artificial barrier 22 for containing the robot 12 within a user-determined boundary.

In the embodiment illustrated, the smartphone 14 includes a display 24, preferably a touchscreen interface, at least one virtual button 26 capable of being accessed by the user on the display 24, and at least one physical button 28 separate from the display 24. The touchscreen display 24 can be a capacitive touchscreen, a resistive touchscreen, or comprise other suitable touchscreen technology capable of sensing touch. The touchscreen technology can be implemented in an input device layered with the electronic visual display of the smartphone 14 through which a user can give input or control the smartphone 14 through single and/or multi-touch gestures.

The smartphone 14 can have a processor or central processing unit (CPU) 29 and an inertial measurement unit (IMU) 30 that measures and reports the smartphone's acceleration, angular rate, and/or the magnetic field surrounding the smartphone 14, using a combination of at least one accelerometer 32, gyroscope 34, and optionally magnetometer or compass 36. The phone accelerometer 32 measures acceleration to identify the phone's orientation through axis-based motion sensing. The phone gyroscope 34 uses Earth's gravity to help determine the phone's orientation. The phone magnetometer or compass 36 measures magnetic fields to determine which way is North by reporting a heading through a digital interface. The smartphone 14 can augment the determination of its orientation by using at least one available onboard camera 38 and computer vision software to detect the smartphone's position relative to its surrounding environment. The smartphone 14 can include additional software and hardware features capable of improving the smartphone's determination of orientation, including but not limited to, a global positioning system (GPS) receiver, infrared projection, depth detection, Wi-Fi™ localization, stereo imaging, etc. Optionally, instead of or in addition to the accelerometer 32, the smartphone 14 can have at least one tilt sensor, which measures the angles of slope or tilt of the smartphone 14 in multiple axes of a reference plane, to identify the phone's orientation.

In one embodiment of the system, the smartphone 14 executes an application for controlling one or more functions of the cleaning robot 12. The application can be a downloaded application. The application includes at least a manual control function for the cleaning robot 12, whereby a user can manually direct the movement of the cleaning robot 12 over a surface to be cleaned. The smartphone 14 can wirelessly communicate with the cleaning robot 12 using any suitable wireless technology, such as Bluetooth® or Wi-Fi™.

FIGS. 2A-2D are schematic illustrations of the system 10 of FIG. 1 in use. A user 40 positions themselves above and behind the cleaning robot 12, opens the application, and holds the smartphone 14 toward the cleaning robot 12, such as by holding the smartphone in one hand 42 of one arm 44. The application can display the virtual button 26 on the display 24, and the user 40 holds the virtual button 26 to activate the cleaning robot 12 and fix the relative position of the cleaning robot 12 with respect to the smartphone 14 by way of the IMU 30, as shown in FIG. 2A. The user 40 can press the virtual button 26 with a finger or thumb of the same hand 42 in which the smartphone 14 is held for a one-handed operation, or can user their other hand 46. As the smartphone 14 is moved by the user 40, the IMU 30 translates or transforms acceleration of the smartphone 14 into corresponding movement of the cleaning robot 12, including forward and backward movement of the cleaning robot 12 as shown in FIG. 2B, turning the cleaning robot 12 left or right, as shown in FIG. 2C or directing the cleaning robot 12 along a complex path, as shown in FIG. 2D. When the virtual button 26 is released or pressed a second time, the cleaning robot 12 stops.

In one embodiment, the user 40 can extend their arm 44 as if they were grasping the handle of an upright or stick vacuum cleaner. In this case, the smartphone 14 essentially acts as a proxy for hand grip on the handle of an upright or stick vacuum cleaner. The fixed relative positions of the cleaning robot 12 with respect to the smartphone 14 emulates a rigid handle.

It is noted that while certain embodiments are described herein as requiring the user 40 to position themselves above and/or behind the robot 12, it is understood that the position of the user 40 relative to the robot 12 is arbitrary, and is rather defined by the position of the smartphone 14 relative to the robot 12. Other predefined relative orientations between the user 40 (i.e. the smartphone 14) and the robot 12 for implementing the manual mode of operation are possible. It is also noted that the term "behind" is used in this context in the conventional sense, i.e. at the rear of the robot 12, which can be defined relative to the directions of forward and rearward travel of the robot 12. For purposes of description related to the figures, the terms "upper," "lower," "right," "left," "rear," "front," "vertical," "horizontal," and derivatives thereof shall relate to the system 10 as oriented in FIGS. 2A-2D from the perspective of the user 40 behind the robot 12, which defines the rear of the robot 12. However, it is to be understood that the invention may assume various alternative orientations, except where expressly specified to the contrary.

When the cleaning robot 12 is in the manual mode of operation, any cliff, bumper, or obstacle sensors of the cleaning robot 12 can still operate to prevent the cleaning robot 12 from running into objects or falling down stairs. The smartphone 14 can provide any type of indication or representation useful for alerting or informing the user that the cleaning robot 12 is approaching or encroaching a cliff, bumper, or obstacle, including, but not limited to, haptic feedback, audible indication, augmented reality display of a virtual barrier, etc. In one example, the smartphone 14 can vibrate in the user's hand to indicate an event, i.e. a cliff, bumper, or obstacle, which can be determined based on input from one or more of the any cliff, bumper, or obstacle sensors of the cleaning robot 12. This haptic feedback can be especially useful to the user if the cleaning robot 12 is not currently visible, such if it is under or behind furniture.

When the cleaning robot 12 is in the manual mode of operation, the artificial barrier 22 may still operate to contain the robot 12 within a predetermined boundary, or the manual mode of operation may override the artificial barrier 22. The smartphone 14 can assist the user in navigating the robot 12 in proximity to the artificial barrier 22. The smartphone 14 can provide any type of indication or representation useful for alerting or informing the user that the cleaning robot 12 is approaching or encroaching the artificial barrier 22 including, but not limited to, haptic feedback, audible indication, augmented reality display of a virtual barrier, etc.

Figure 3:
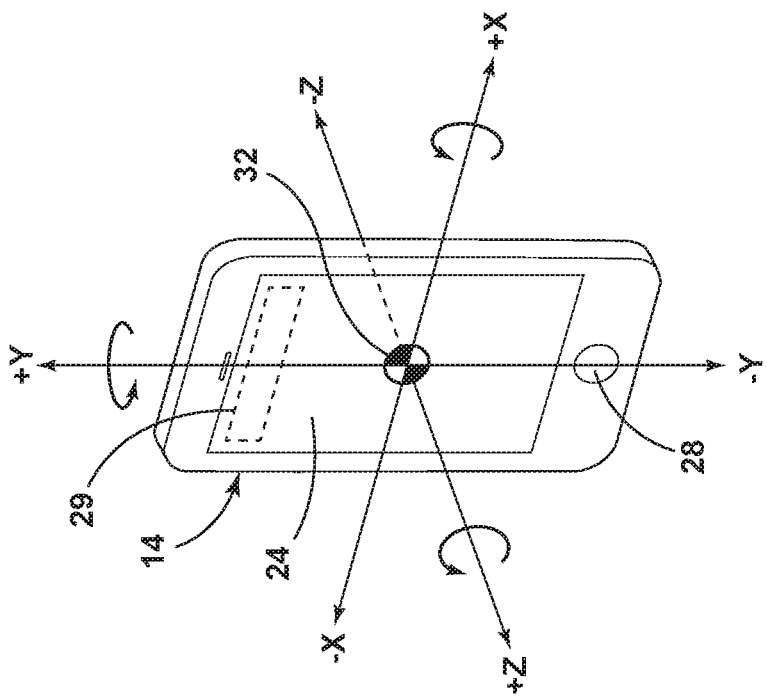
FIG. 3 is a schematic illustration of one embodiment of a frame of reference for a smartphone of the system of FIG. 1.

FIG. 3 illustrates one embodiment of a frame of reference for the smartphone 14. The frame of reference for the smartphone 14 is dependent upon the type and location of the sensors provided on the smartphone 14 for detecting and registering motion of the smartphone 14. In the illustrated embodiment, the frame of reference is shown as being relative to the accelerometer 32, which but may also be relative to a tilt sensor or other sensor of the smartphone 14. The accelerometer 32 can comprise a three-axis accelerometer which delivers acceleration values in each of three orthogonal axes, X, Y, and Z, as shown, and measures changes in velocity along each axis. The X axis extends side-to-side across the smartphone 14, the Y axis extends top-to-bottom across the smartphone 14, and the Z axis extends orthogonally relative to the face of the display or touchscreen 24 of the smartphone 14. Acceleration values may be positive or negative depending on the direction of the acceleration along each axis. The processor 29 on the smartphone 14 can read in the data from the accelerometer 32 and convert the data to a smartphone-based frame of reference. One common frame of reference for smartphones is roll, pitch and yaw. The smartphone 14 is free to rotate in three dimensions within the frame of reference: rotation around the Y axis or roll; rotation around the X axis or pitch; and rotation around the Z axis or yaw.

Figure 4:
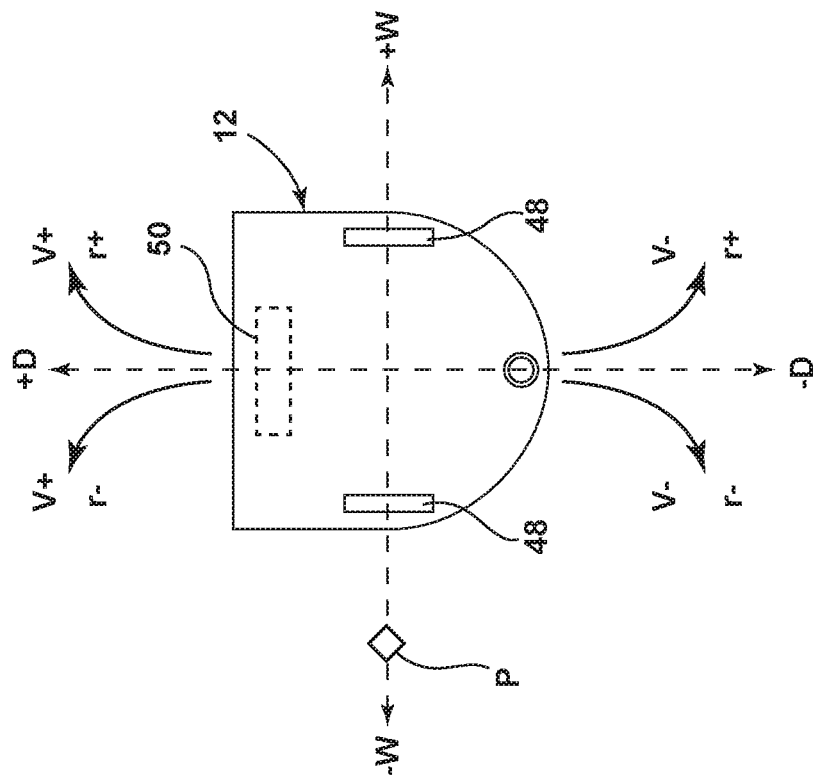
FIG. 4 is a schematic illustration of one embodiment of a frame of reference for the autonomous floor cleaner of the system of FIG. 1.

FIG. 4 illustrates one embodiment of a frame of reference for movement of the robot 12 according to one kinematic model. The robot 12 includes a drive system having at least two drive wheels 48 for driving the unit across a surface to be cleaned and which define a wheel axis W through the wheels' center of rotation. The drive wheels 48 can be operated by a common drive motor or individual drive motors (not shown) coupled with the drive wheels 48 by a transmission, which may include a gear train assembly or another suitable transmission. The wheels 48 can be driven at the same or different speeds, and in the same or in opposite directions. The robot 12 can translate along a drive axis D, which can be an axis extending in the front-to-rear direction of the robot 12, equidistant between the drive wheels 48. The origin of the frame of reference for movement of the robot 12 can be the intersection between the wheel axis W and the drive axis D.

In one example, the kinematic model is one where the robot's movement is completely prescribed by a velocity V of the robot 12 and a radius of curvature r. In this model, the robot 12 is always driving in a circle having a radius of curvature r at velocity V. Both of these quantities can range from positive (+) to negative (−) values, depending on the direction of the movement along the drive axis D. Radius of curvature values may be positive or negative depending on the direction of the turn away from the drive axis D. The robot 12 can include a processor for converting these quantities to angular velocities for the left and right wheels 48. Driving both wheels 48 at the same angular velocity and in the same forward or reverse direction moves the robot 12 forwardly or rearwardly, straight along the drive axis D. Driving the wheels 48 at different angular velocities results in the robot 12 turning in an arc toward the slower wheel, about a pivot point P defined somewhere along the wheel axis W, with the turn being defined by its radius of curvature r.

Turns having different radius of curvature r can be performed based on where the pivot point P is set along the wheel axis W, the magnitude of difference between the angular velocity of each wheel 48, and whether the wheels 48 are driven in the same or opposite directions. In FIG. 4, the pivot point P is shown in one exemplary location as being outside the robot 12, which will perform an outside arc turn. For other turns, the pivot point P is elsewhere along the wheel axis. Some example turns include a locked wheel turn where the pivot point P is at the center of one of the wheels 48, an inside arc turn where the pivot point P is somewhere between one of the wheels 48 and the drive axis D, or a zero-radius turn where the pivot point P is at the drive axis D. Straight movement of the robot 12 can also be described as a turn where the pivot point P is infinitely far away from the robot 12.

Referring to FIGS. 1-4, the smartphone processor 29 can comprise an executable algorithm or software code, referred to herein as a move algorithm, for transforming the detected acceleration of the smartphone 14, and/or other sensor data from the IMU 30, into movement instructions executable by a controller 50 of the robot 12. The movement instructions can comprise a control command or other communication provided to the controller 50 of the robot 12, which in turn controls the drive system accordingly. A control command can include instructions to drive one or both of the wheels 48, direction of wheel rotation, and speed of wheel rotation. A control command can include velocity and radius of curvature values for moving the robot 12 with its frame of reference as described above with reference to FIG. 4.

The smartphone 14 can perform this transformation according to a variety of methods. In one embodiment, the processor 29 can perform a geometrical conversion to transform the detected acceleration of the smartphone 14, and/or other sensor data from the IMU 30, into movement instructions executable by a controller 50 of the robot 12. For example, the accelerometer 32 on the smartphone 14 can provide the data that represents the pose (e.g. roll, pitch, and yaw) of the smartphone 14, and the pose of the smartphone 14 is converted into movement instructions comprising, for example, velocity and radius of curvature values for the robot 12 according to the kinematic model described for FIG. 4. The sensed pitch ($\theta$) and yaw ($\varphi$) of the smartphone 14 can be transformed into an x and y coordinate to indicate a point in a 2D Cartesian coordinate frame, according to the following equations:

$$x = \cos(\varphi)\cos(\theta) \quad (1)$$

$$y = \sin(\varphi)\cos(\theta) \quad (2)$$

The velocity V and radius of curvature r can then be determined from the resultant (x,y) coordinate pair, according to the following equations:

$$V = \text{sgn}(y)\sqrt{(x^2+y^2)} \quad (3)$$

$$r = \text{sgn}(x)|\tan(x+\pi/2)| \quad (4)$$

Alternatively, the velocity V and the radius of curvature r can be defined with respect to the smartphone frame of reference as:

$$V = \text{sgn}(\sin(\varphi)\cos(\theta))\sqrt{((\cos(\varphi))\cos(\theta))^2 + (\sin(\varphi)\cos(\theta))^2)} \quad (5)$$

$$r = \text{sgn}(\cos(\varphi)\cos(\theta))|\tan(\cos(\varphi)\cos(\theta)+\pi/2)| \quad (6)$$

Optionally, depending upon the fidelity of the roll, pitch, and yaw data, the processor 29 may perform one or more data smoothing operations such as low pass filtering to eliminate spurious noise and generally flatten the pose data to prevent higher order motion from corrupting the motion of the robot 12.

In another embodiment, the processor 29 can access a lookup table where values representing smartphone pose, or other acceleration data, have been stored, along with corresponding predetermined movement instructions for the robot 12. For example, the accelerometer 32 on the smartphone 14 can provide the data that represents the pose (e.g. roll, pitch, and yaw) of the smartphone 14, and the processor 29 can compare the pose data to the pose values in the lookup table, and provide the corresponding movement instructions stored in the lookup table to the controller 50 of the robot 12 for execution of the movement instructions.

In yet another embodiment, the robot 12 can perform this transformation instead of the smartphone 14. In this case, the robot controller 50 can comprise an executable move algorithm or software code for transforming the detected acceleration of the smartphone 14, and/or other sensor data from the IMU 30, into movement instructions executable by the controller 50. The smartphone 14 transmits its pose, the detected acceleration of the smartphone 14, and/or other sensor data from the IMU 30 to the robot 12, and the controller 50 performs the transformation either by conversion or using a lookup table, as described above.

Figure 5:
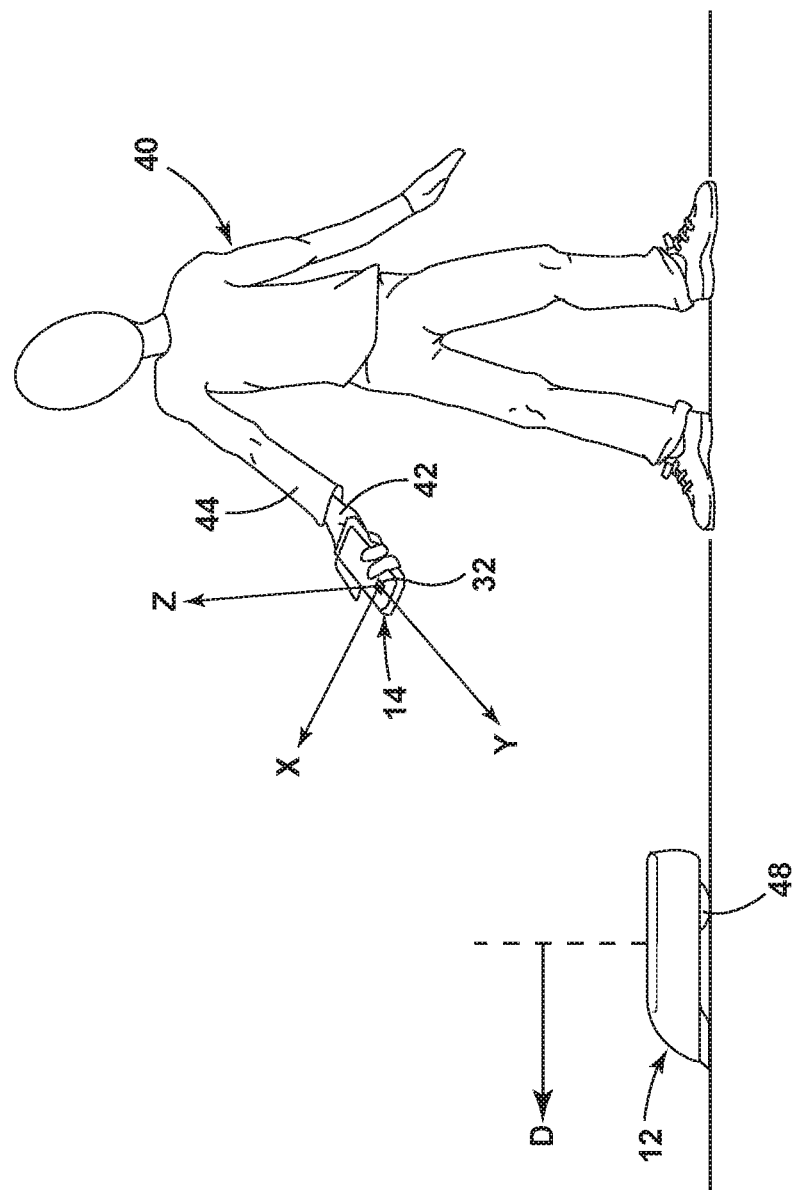
FIG. 5 is a schematic illustration of a cleaning robot translation function for the system of FIG. 1.

FIG. 5 illustrates a cleaning robot translation function for the system 10 of FIG. 1. The translating movement of the robot 12 along drive axis D, including the speed of movement and whether the robot 12 translates forward or backward along the drive axis D, can be a function of a transformation of the smartphone accelerometer 32 relative to the Y axis, a transformation of the smartphone accelerometer 32 relative to the Z axis, and, optionally, a scaling factor, such as a linear amplification factor. The smartphone processor 29 can execute the move algorithm or software code and transform the detected acceleration of the smartphone 14 relative to the Y and Z axes, optionally along with the scaling factor, into movement instructions executable by a controller 50 of the robot 12.

In one embodiment, wheel motor drive speed is in direct proportion to the geometric transformation of the smartphone accelerometer 32 relative to the accelerometer axes Y and Z. A scaling factor can be applied to the accelerometer 32 to get proportional movement from the user's perspective. For example, the robot velocity can optionally be at least 1.2 times, at least 1.5 times, or at least 2.0 times the velocity of the smartphone 15. A fast filter function, such as an averaging filter, can be applied to the accelerometer 32 to eliminate noise. In this way, the cleaning robot translation function can enable the smartphone 14 to emulate a rigid handle such that when the smartphone 14 moves, the distance between the smartphone 14 and the cleaning robot 12 can remain the same. In another embodiment, an application on the smartphone 14 can measure a distance to the cleaning robot 12 at some initial time and set the cleaning robot translation function to maintain that measured distance thereby emulating a rigid handle. The smartphone 14 can leverage any sensor, technology, method and combinations thereof available to conventional or bespoke smartphones to measure the distance to the cleaning robot 12, including, but not limited to, Bluetooth® or Wi-Fi™ localization, measurement of radio signal strength indicator (RSSI), timing the round-trip of data packets, etc.

Figure 6:
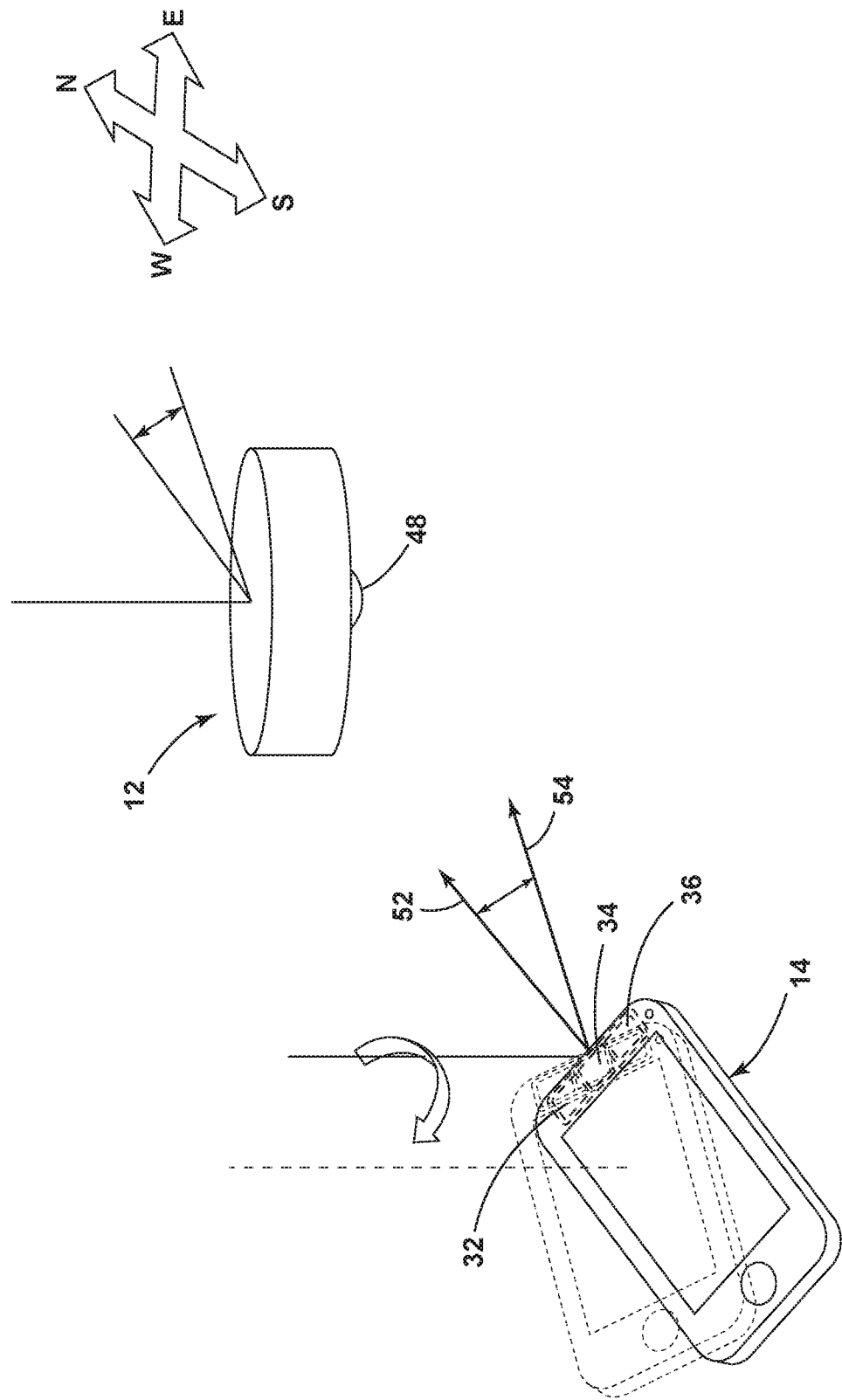
FIG. 6 is a schematic illustration of a cleaning robot turning function for the system of FIG. 1.

FIG. 6 is a schematic illustration of a cleaning robot turning function for the system 10 of FIG. 1. The turning movement of the robot 12, including the speed of movement and whether the robot 12 turns left or right from the perspective of the user, can be a function of a radial acceleration of the smartphone 14, which can be determined by the gyroscope 34, a compass heading of the smartphone 14, which can be determined by the magnetometer or compass 36, and, optionally, a scaling factor. The smartphone processor 29 can execute the move algorithm or software code and transform the detected radial acceleration and compass heading, optionally along with the scaling factor, into movement instructions executable by a controller 50 of the robot 12.

In one example, a first compass heading 52 of the smartphone 14 is compared to a second compass heading 54 of the smartphone 14 to determine a compass heading change. The difference in speed between the wheel driving motors for the wheels 48 can be in direct proportion to the smartphone's radial acceleration and the compass heading change, along with the scaling factor. A filter, such as a band pass filter, can be applied to the smartphone inputs to permit small changes in heading without causing motion of the cleaning robot 12. A noise filter can also be applied to smooth transient effects.

Referring again to FIGS. 1-4, in one embodiment, the smartphone processor 29 can comprise an executable algorithm or software code, referred to herein as a display algorithm, for transforming the detected acceleration of the smartphone 14, and/or other sensor data from the IMU 30, or and/or the movement instructions for the robot 12, into display instructions for a user interface, or more specifically for a user interface comprising at least one user interface element, that is displayable on the display 24 of the smartphone 14. The user interface can map the user-initiated motion of the smartphone 14 to direct the movement of the robot 12.

To provide a user interface on the smartphone 14, the processor 29 can convert the data that represents the pose (e.g. roll, pitch, and yaw) of the smartphone 14 to a frame of reference amenable to display and intuitive to the user. For example, the sensed pitch (θ) and yaw (φ) of the smartphone 14 can be transformed into an x and y coordinate to indicate a point in a 2D Cartesian coordinate frame, according to Equations (1) and (2) above.

The resultant (x,y) coordinate pair for a given pitch (θ) and yaw (φ) can be used in the user interface to place an indicia of the robot 12 on the display 24. In this way, the user-initiated pose of the smartphone 14 is transformed into a user interface element that conveys the intended motion of the robot 12. Optionally, depending upon the fidelity of the roll, pitch, and yaw data, the processor 29 may perform one or more data smoothing operations such as low pass filtering to eliminate spurious noise and generally flatten the pose data to prevent higher order motion from corrupting the user interface.

Figure 7B:
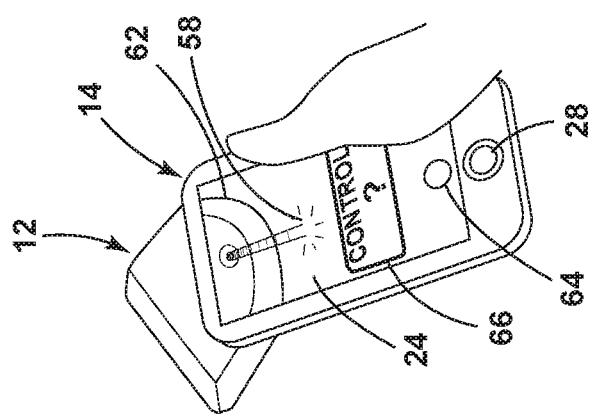
FIG. 7B is a schematic illustration of the application of FIG. 7A during the manual mode of operation.
Figure 7A:
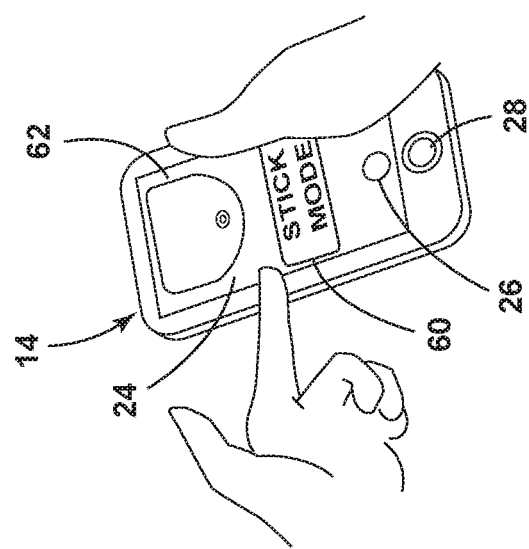
FIG. 7A is a schematic illustration of one embodiment of an application executed on a smartphone for the system of FIG. 1 during initiation or activation of the manual mode of operation.

FIG. 7A is a schematic illustration of one embodiment of the application on the smartphone 14 during initiation or activation of the manual mode of operation. The application can display the virtual button 26 on the display 24, which may include associated text 60 such as "manual mode" or "stick mode" indicating the purpose of the virtual button 26. Pressing the virtual button 26 once can activate the cleaning robot 12 and fix the position of the cleaning robot 12 to the smartphone 14 by way of the IMU 30 (FIG. 1). The user may have to hold the virtual button 26 to maintain the manual mode of operation, or, as illustrated herein, can release the virtual button 26 and simply hold or move the smartphone 14 to direct the movement of the cleaning robot 12, as shown in FIG. 7B. The application can display a representation 62 of the robot 12 on the display 24. The representation 62 can be a user interface element placed according to a transformation of smartphone pose data into a 2D Cartesian coordinate pair as described above. Alternatively or additionally, the representation 62 can be an icon or graphic, a live video feed to the robot 12, and/or one or more augmented reality features, as described in further detail below.

Referring to FIG. 7B, in one embodiment, the smartphone 14 can include augmented reality features to provide a live direct or indirect view of the smartphone's or cleaning robot's environment. The augmented reality features can include additional display or interactive elements fused with a live view of the robot 12 shown on the smartphone display 24. For example, the smartphone display 24 can present an augmented reality view where a representation of a virtual stick or handle of a vacuum cleaner is fused with a live video feed of the cleaning robot where the live video feed is captured by the camera 38 located on the smartphone 14. The smartphone 14 can include any augmented reality features useful for providing controls for directing the cleaning robot 12, including, but not limited to, computer-generated or extracted real-world sensory input such as sound, video, graphics, haptics or GPS data. For example, the smartphone 14 can include an augmented reality feature for modifying the cleaning robot's planned path where the cleaning robot's planned path is fused as an overlay 58 onto the camera feed and presented to the user on the smartphone display 24. In another example, the smartphone 14 can include an augmented reality feature for modifying the cleaning robot's planned path where the cleaning robot's planned path is fused as an overlay onto a map of the environment to be navigated where digital representations of objects in the environment are also fused onto the map and presented to the user on the smartphone display 24. The user can modify the planned path with any type of interaction useful for inputting data into a smartphone including, but not limited to, touch interaction, multi-touch interaction, gestures and audible notifications.

In one embodiment, imagery from one or both of a camera on-board the robot 12 can be displayed on the touchscreen 24. For example, if the robot is driven into a hard to see area, such as under, behind, or between furniture, the point-of-view imagery from the robot can be accessed by the user via the smartphone 14 to help the user continue to direct the movement of the robot 12, even without a line of sight to the robot 12.

After activation of the manual mode of operation, the application can display other virtual buttons on the display 24. For example, as shown in FIG. 7B, a virtual button 64 corresponding to further application functions can be shown on the display 24, and may include associated text 66 indicating the purpose of the virtual button 26.

Figure 8:
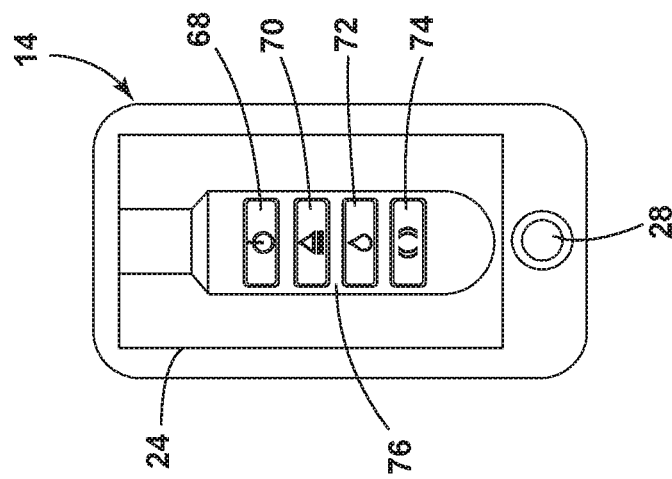
FIG. 8 is a schematic illustration of one embodiment of an application executed on a smartphone for the system of FIG. 1 showing optional application functions.

FIG. 8 is a schematic illustration of one embodiment of the application on the smartphone 14 showing further application functions on the display 24 of the smartphone 14. Pressing the virtual button 64 shown in FIG. 7B corresponding to further application functions can bring up the screen shown in FIG. 8. Each application function can have an associated virtual button shown on the display 24. Examples of further application functions include, but are not limited to, a power function for powering off the cleaning robot 12 and having an associated virtual power button 68, a quit function for deactivating the manual mode of operation and initiating the autonomous mode of operation, and having an associated virtual quit button 70, a manual dispensing function for dispensing fluid on command from the cleaning robot 12 and having an associated virtual fluid dispensing button 72, and a dirt sensing function for alerting the user to when dirt or debris is encountered by the cleaning robot 12 and having an associated virtual dirt sensing button 74. The buttons 68-74 can optionally be displayed as physical buttons on a graphical representation of a virtual stick or handle 76 of a vacuum cleaner.

Figure 9:
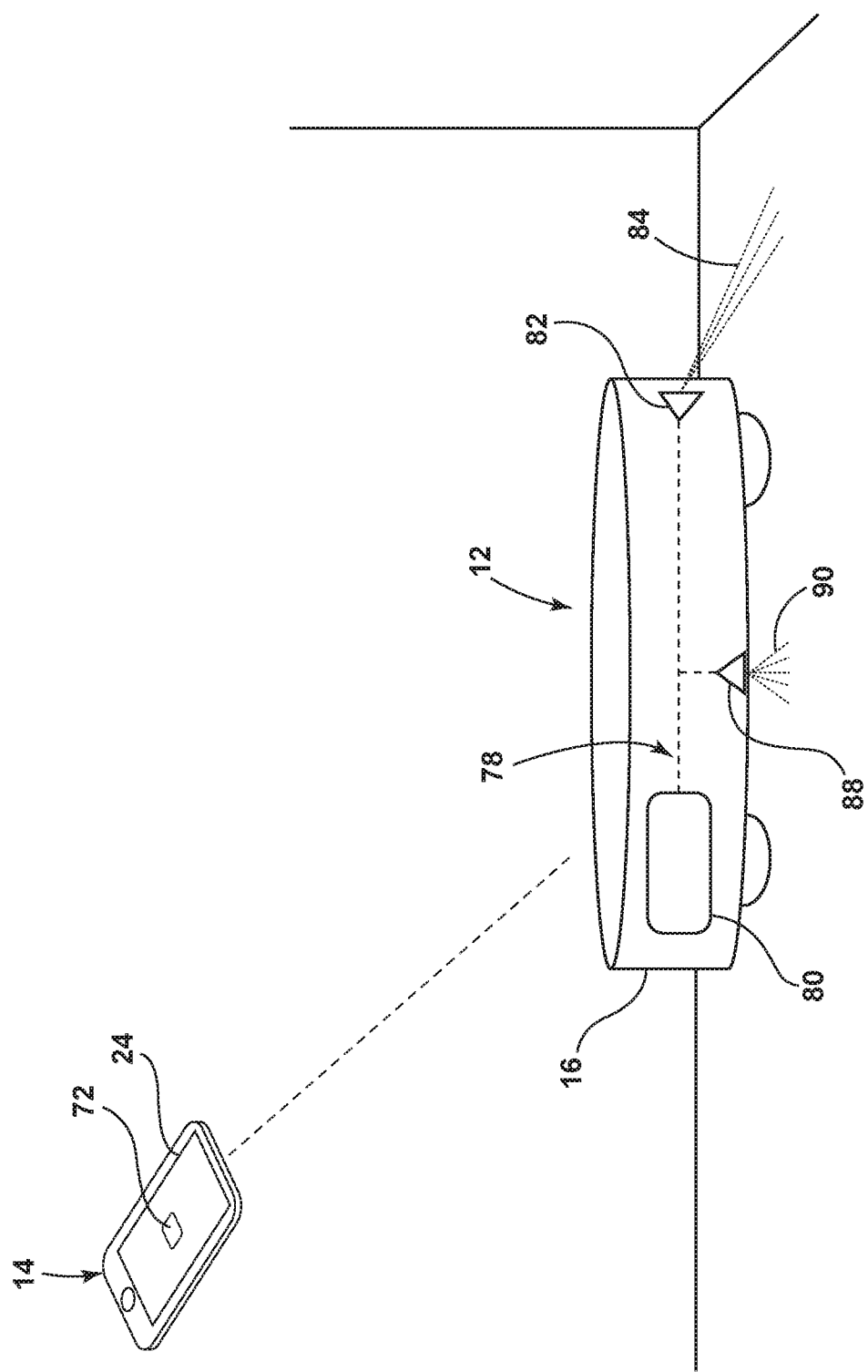
FIG. 9 is a schematic illustration of an optional manual dispensing function for the system of FIG. 1.

FIG. 9 illustrates a function where fluid, such as a cleaning liquid, is dispensed on command from the cleaning robot 12. This manual dispensing function may be applicable for a cleaning robot 12 comprising a deep cleaning robot having a fluid supply system 78 for storing cleaning fluid and delivering the cleaning fluid to the surface to be cleaned.

As shown herein, the fluid supply system 78 includes an on-board supply tank 80 and at least one manually-controllable sprayer or spray nozzle 82 is provided on the deep cleaning robot 12. The sprayer 82 can dispense fluid 84 directly onto a surface to be cleaned outwardly from the robot 12 so that the user can see exactly where formula is being dispensed. For example, the sprayer 82 can dispense fluid 84 forwardly, rearwardly, laterally, or anywhere outward from the housing 16 of the robot 12. As shown herein, the sprayer 82 is positioned on the exterior of the robot housing 16 to spray fluid 84 forwardly of the robot 12, such that both the sprayer 82 and the fluid 84 it dispenses is easily viewed by a user operating the robot 12. This permits the user to see exactly where the spray of fluid 84 strikes the surface to be cleaned, allowing for a more focused treatment of an area of the surface to be cleaned.

The amount or volume of cleaning formula may also be controlled, such as by requiring the user to hold down or press a virtual button, such as the virtual fluid dispensing button 72 (FIG. 8) on the smartphone 14 for a duration of time equal to the dispensing time from the sprayer 82. The application can be configured to allow the user to customize dispensing, such as setting a fixed volume of formula to be dispensed upon each actuation of the button 72, or setting a dispensing rate from the sprayer 82.

The fluid delivery system 78 of the deep cleaning robot 12 can optionally include at least one other sprayer or spray nozzle 88 in addition to the manually-controllable sprayer or spray nozzle 82. Both sprayers 82, 88 can be in fluid communication with the supply tank 80. The at least one second sprayer 88 can be positioned to dispense fluid 90 onto the surface to be cleaned, either directly onto the surface to be cleaned, such as by having an outlet of the sprayer 88 positioned in opposition to the surface, or indirectly onto the surface to be cleaned, such as by having an outlet of the sprayer 88 positioned to dispense onto a brushroll. This may be particularly useful when treating visible or hard-to-treat stains on the surface to be cleaned.

In one embodiment, the at least one second sprayer 88 is positioned to dispense fluid 90 onto the surface to be cleaned underneath the robot 12, rather than out in front of the robot 12 as for the first sprayer 82. As such, the at least one second sprayer 88 may be used by default under automated operation to deliver cleaning fluid to the surface to be cleaned, while the first sprayer 82 may be used during manual control at a user's discretion to deliver a focused spray of cleaning fluid 84 to a limited area of the surface of the cleaned separate and apart from the second sprayer 88.

In embodiments where multiple sprayers or nozzles are present on the cleaning robot 12, multiple virtual buttons can be provided for controlling on-demand dispensing from one or more of the sprayers. This provides the user with full control of where and when formula is dispensed from the robot 12.

Figure 10:
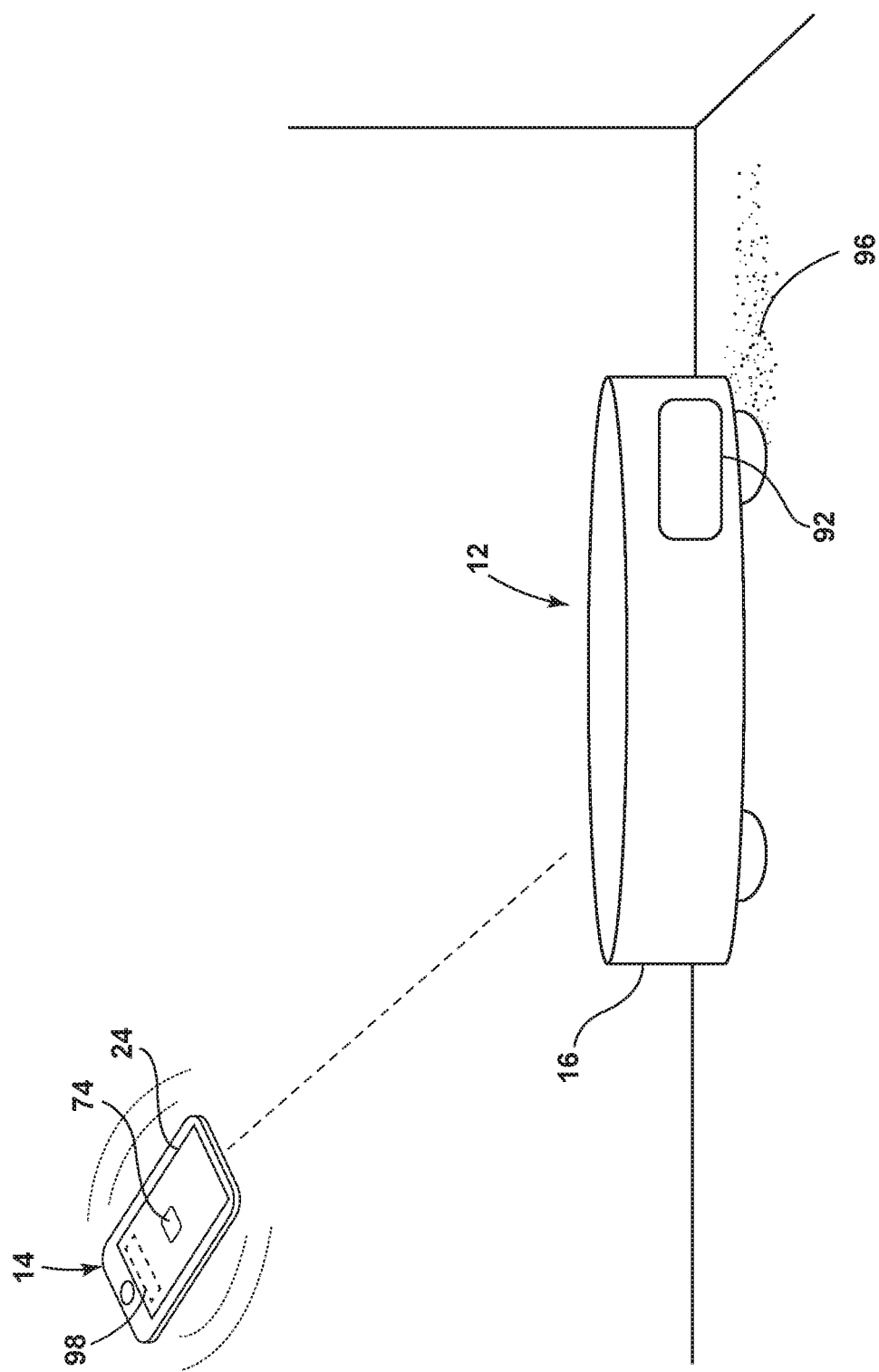
FIG. 10 is a schematic illustration of an optional dirt sensing function for the system of FIG. 1.

FIG. 10 illustrates the optional function where the user is alerted when dirt or debris is encountered by the cleaning robot 12. In the embodiment shown, the smartphone 14 vibrates when dirt is encountered. A dirt sensor 92 on the cleaning robot 12 can detect dirt 96 and communicate sensor input with the smartphone 14. The smartphone 14 can include a vibration motor 98 which can be selectively activated based on input from the dirt sensor 92, and operates to produce vibration of the smartphone 14 when dirt is detected by the dirt sensor 92. The smartphone 14 can provide any type of indication or representation useful for alerting or informing the user to the sensed dirt level including, but not limited to haptic feedback where the phone 14 stops vibrating when the floor surface is clean, push notifications, augmented reality display to visualize the robot's cleaning progress, audible feedback, etc. The dirt sensing function can be initiated via the smartphone 14, such as by requiring the user to hold down or press a virtual button, such as the virtual dirt sensing button 74 (FIG. 8) on the smartphone 14.

Figure 11:
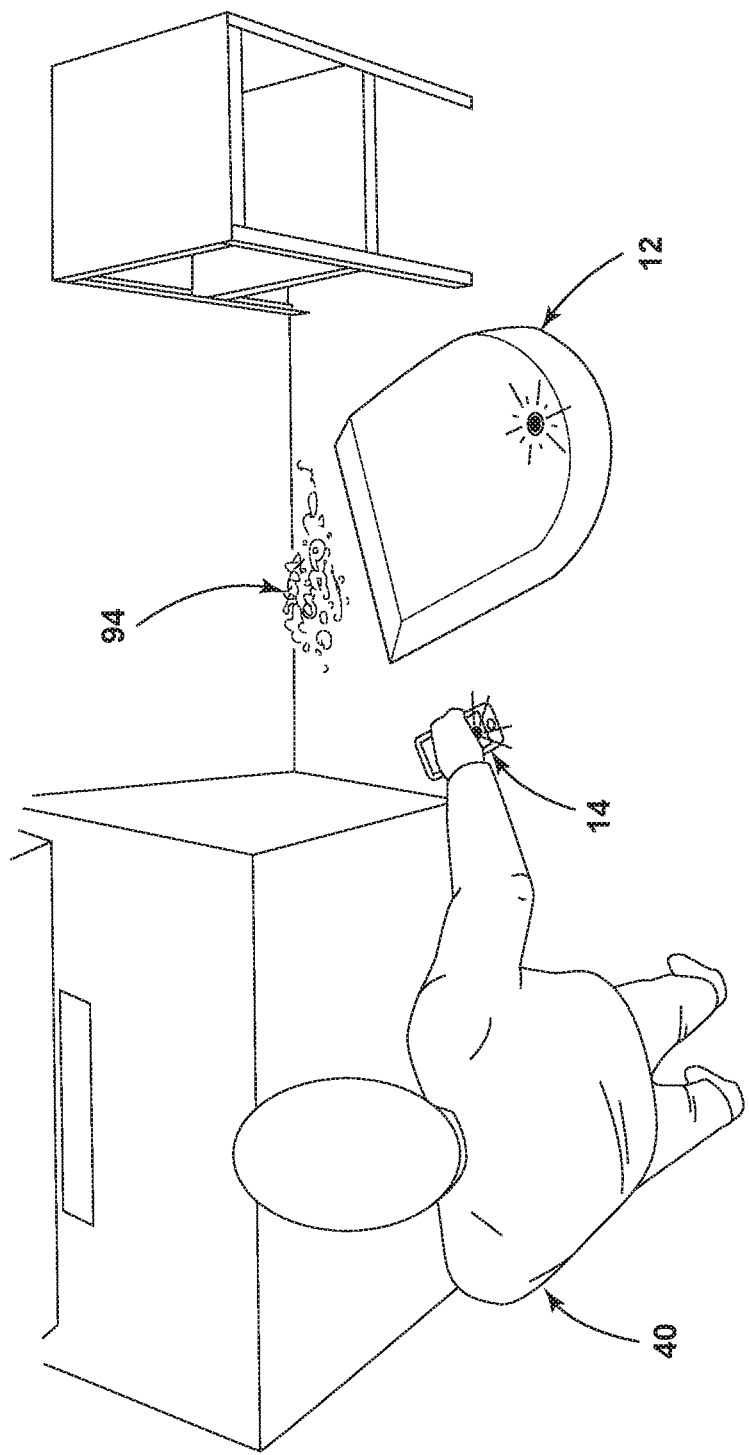
FIG. 11 is a schematic illustration of the system of FIG. 1 in use to clean a hard to reach area.

FIG. 11 is a schematic illustration of the system 10 of FIG. 1 in use to clean a hard to reach area. Using the system 10, the user 40 can manually direct the cleaning robot 12 into a hard to reach area 94 that the cleaning robot 12 may miss under autonomous operation. In one embodiment, the cleaning robot 12 can learn from the manually directed cleaning operation. In this way, the user 40 can train the cleaning robot 12 how to navigate the hard to reach area 94 such that in later autonomous cleaning cycles, the cleaning robot 12 can return to the previously hard to reach area 94 and conduct a cleaning cycle of operation.

Figure 12:
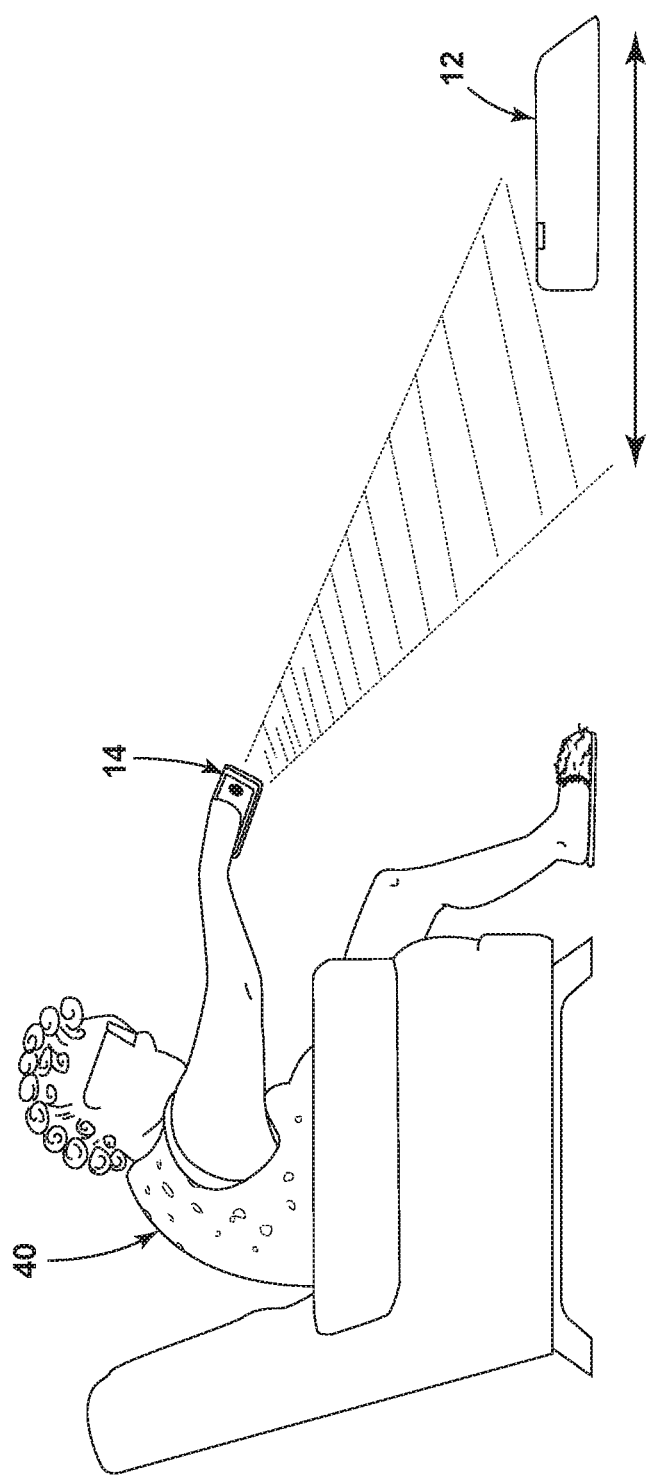
FIG. 12 is a schematic illustration of the system of FIG. 1 in use by a user with limited mobility.

FIG. 12 is a schematic illustration of the system 10 of FIG. 1 in use by a user 40 with limited mobility. Using the system 10, users with limited mobility are given direct control of the cleaning robot 12. The cleaning robot translation function that transforms movement of the smartphone 14 into corresponding movement of the cleaning robot 12 can dynamically adjust to better assist a user with limited mobility. In addition to a system where the smartphone 14 is virtually bound to the cleaning robot 12 as if the smartphone 14 were a handle to an upright or stick vacuum cleaner, the interaction between the smartphone 14 and the cleaning robot 12 can be relaxed such that the virtual stick connecting therebetween can stretch or extend to enhance the coverage area of the cleaning robot 12 during a cycle of operation. Other modes of operation are contemplated that can further enable the user 40 to direct the cleaning robot 12. For example, a gesture by the user 40 can direct the cleaning robot 12 to initially extend away from the user 40 and then return such that the user 40 is controlling the cleaning robot 12 like a yo-yo.

In an alternative embodiment of the systems disclosed herein, the system can include a dedicated remote control device having an IMU chip and a processor or CPU that can execute a move algorithm or software code for transforming the detected acceleration of the remote control device, and/or other sensor data from the IMU chip, into movement instructions executable by the controller 50 of the robot 12, instead of the smartphone 14. The dedicated remote control device can be configured to perform any of the robot control functions discussed herein with respect to the smartphone 14.

In another alternative embodiment of the systems disclosed herein, any of the virtual or touchscreen buttons discussed herein may be provided as physical buttons on the smartphone 14 or other remote control device.

Figure 13:
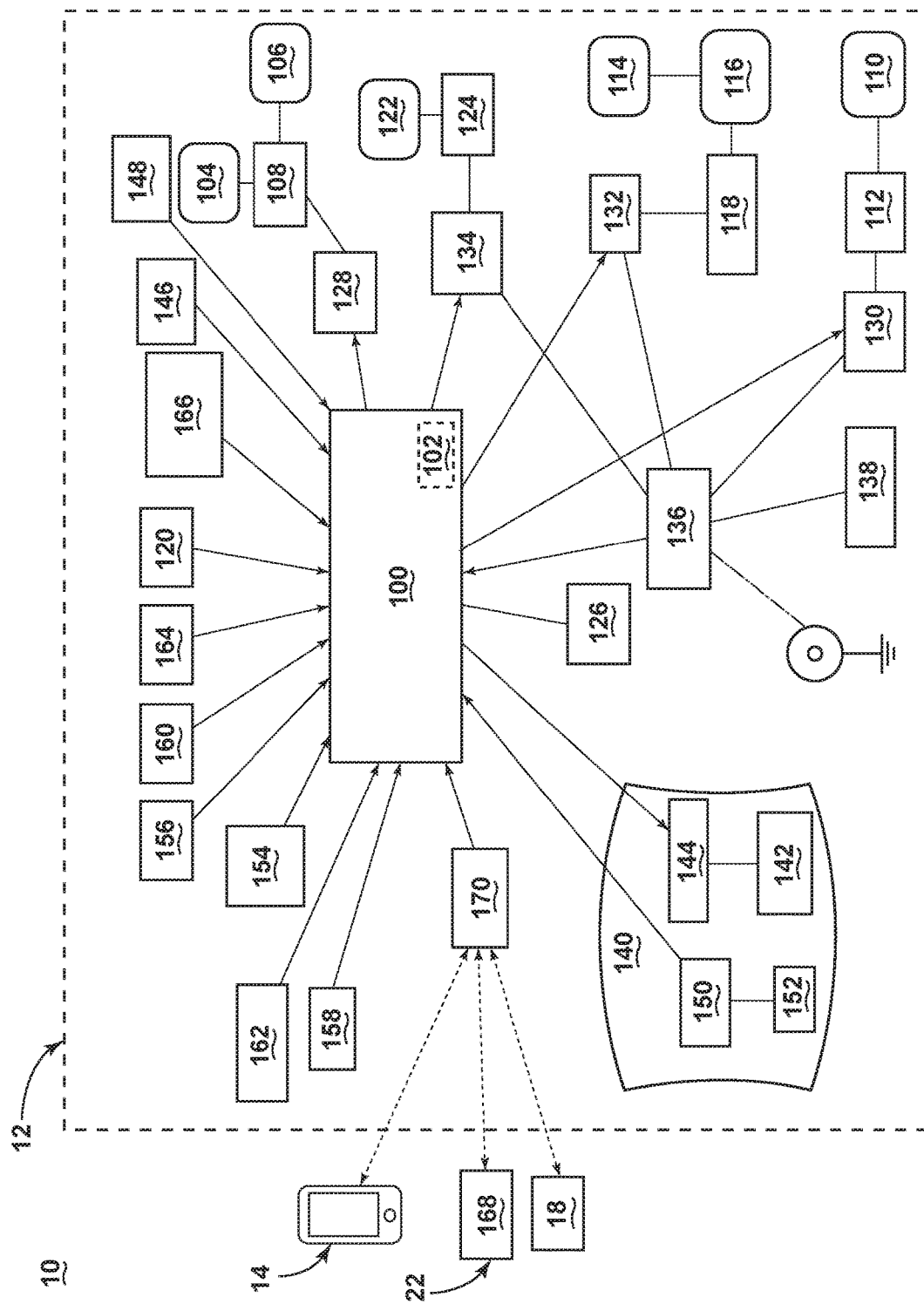
FIG. 13 is a schematic view of one embodiment of an autonomous deep cleaner for use in the system of FIG. 1.

FIG. 13 is a schematic view of one embodiment of an autonomous deep cleaner or deep cleaning robot 12 for the system 10 of FIG. 1. It is noted that the robot 12 shown in FIG. 13 is but one example of a deep cleaning robot that is usable with the system 10, and that other autonomous cleaners requiring liquid supply and disposal can be used with the system 10, including, but not limited to autonomous deep cleaners capable of delivering steam, mist, or vapor to the surface to be cleaned. It is further noted that a dry vacuum robot for the system 10 of FIG. 1 may have many of the same components, save for those pertaining to the fluid supply or dispensing.

The deep cleaning robot 12 mounts the components of various functional systems of the extraction cleaner in an autonomously moveable unit or housing (e.g. housing 16 of FIG. 1), including at least the components of a fluid supply system for storing cleaning fluid and delivering the cleaning fluid to the surface to be cleaned, a fluid recovery system for removing the cleaning fluid and debris from the surface to be cleaned and storing the recovered cleaning fluid and debris, and a drive system for autonomously moving the robot 12 over the surface to be cleaned.

In the autonomous mode of operation, the deep cleaning robot 12 can be configured to move randomly about a surface while cleaning the floor surface, using input from various sensors to change direction or adjust its course as needed to avoid obstacles, or, as illustrated herein, can include a navigation/mapping system for guiding the movement of the robot 12 over the surface to be cleaned in a structured fashion, generating and storing maps of the surface to be cleaned, and recording status or other environmental variable information. In the manual mode of operation, the movement of the deep cleaning robot 12 is controlled using the smartphone 14 as previously described. The moveable unit can include a main housing adapted to selectively mount components of the systems to form a unitary movable device.

A controller 100 is operably coupled with the various function systems of the robot 12 for controlling its operation. The controller 100 can be a microcontroller unit (MCU) that contains at least one central processing unit (CPU) 102. The controller 100 can execute movement instructions from the smartphone 14, and/or can transform the detected acceleration of the smartphone 14, and/or other sensor data from the IMU 30 of the smartphone 14, into movement instructions executable by the controller 100, as discussed previously herein.

The fluid delivery system can include a supply tank 104 for storing a supply of cleaning fluid and at least one fluid distributor 106 in fluid communication with the supply tank 104 for depositing a cleaning fluid onto the surface. The cleaning fluid can be a liquid such as water or a cleaning solution specifically formulated for carpet or hard surface cleaning. The fluid distributor 106 can be one or more spay nozzles provided on the housing of the unit. Alternatively, the fluid distributor 106 can be a manifold having multiple outlets. Optionally, multiple sprayers or nozzles 82, 88 can be provided as shown for FIG. 9.

A fluid delivery pump 108 may be provided in the fluid pathway between the supply tank 104 and the at least one fluid distributor 106 to control the flow of fluid to the at least one fluid distributor 106. Various combinations of optional components can be incorporated into the fluid delivery system as is commonly known in the art, such as a heater for heating the cleaning fluid before it is applied to the surface or one more fluid control and mixing valves.

At least one agitator or brush 110 can be provided for agitating the surface to be cleaned. The brush 110 can be a brushroll mounted for rotation about a substantially horizontal axis, relative to the surface over which the unit moves. A drive assembly including a separate, dedicated brush motor 112 can be provided within the unit to drive the brush 110. Alternatively, the brush 110 can be driven by the vacuum motor. Other embodiments of agitators are also possible, including one or more stationary or non-moving brushes, or one or more brushes that rotate about a substantially vertical axis.

The fluid recovery system can include an airflow or extraction path through the unit having an air inlet and an air outlet, an extraction or suction nozzle 114 which is positioned to confront the surface to be cleaned and defines the air inlet, a collection chamber or recovery tank 116 for receiving dirt and/or liquid removed from the surface for later disposal, and a suction source 118 in fluid communication with the suction nozzle 114 and the recovery tank 116 for generating a working air stream through the extraction path. The suction source 118 can be a vacuum motor carried by the unit, fluidly upstream of the air outlet, and can define a portion of the extraction path. The recovery tank 116 can also define a portion of the extraction path, and can comprise an air/liquid separator for separating liquid from the working airstream. Optionally, a pre-motor filter and/or a post-motor filter (not shown) can be provided as well. It is noted that many of the components of the fluid recovery system are analogous to those of a vacuum collection system for a dry autonomous vacuum cleaner.

While not shown, a squeegee can be provided on the housing of the unit, adjacent the suction nozzle 114, and is configured to contact the surface as the unit moves across the surface to be cleaned. The squeegee wipes residual liquid from the surface to be cleaned so that it can be drawn into the fluid recovery pathway via the suction nozzle 114, thereby leaving a moisture and streak-free finish on the surface to be cleaned.

The drive system can include drive wheels 122 for driving the unit across a surface to be cleaned. The drive wheels 122 can be operated by a common drive motor or individual drive motors 124 coupled with the drive wheels 122 by a transmission, which may include a gear train assembly or another suitable transmission. The drive system can receive inputs from the controller 100 for driving the unit across a floor, based on inputs from the navigation/mapping system for the autonomous mode of operation or based on inputs from the smartphone 14 for the manual mode of operation. The drive wheels 122 can be driven in a forward or reverse direction in order to move the unit forwardly or rearwardly. Furthermore, the drive wheels 122 can be operated simultaneously or individually, and at different velocities, in order to turn the unit in a desired direction.

The controller 100 can receive input from the navigation/mapping system and/or from the smartphone 14 for directing the drive system to move the robot 12 over the surface to be cleaned. The navigation/mapping system can include a memory 126 that stores maps for navigation and inputs from various sensors that is used to guide the movement of the robot 12 in a structured fashion (e.g. boustrophedon rows). For example, wheel encoders 120 can be placed on the drive shafts of the wheel motors 124, and are configured to measure the distance traveled. The measurement can be provided as input to the controller 100.

Motor drivers 128, 130, 132, 134 can be provided for controlling the pump motor 108, brush motor 112, vacuum motor 118, and wheel motors 124, respectively, and act as an interface between the controller 100 and the motors. The motor drivers 128-134 may be an integrated circuit chip (IC). For the wheel motors 124, one motor driver 134 can control the motors simultaneously.

The motor drivers 128, 130, 132, 134 for the pump motor 108, brush motor 112, vacuum motor 118, and wheel motors 124 can be electrically coupled to a battery management system 136 that includes a rechargeable battery or battery pack 138. In one example, the battery pack 138 can include lithium ion batteries. Charging contacts for the battery pack 138 can be provided on the exterior of the unit. The docking station 18 (FIG. 1) can be provided with corresponding charging contacts.

The controller 100 is operably coupled with a user interface 140 (UI) on the robot 12 for receiving inputs from a user. The user interface 140 can be used to select an operation cycle for the robot 10 or otherwise control the operation of the robot 12. The user interface 140 can have a display, such as an LED display 142, for providing visual notifications to the user. A display driver 144 can be provided for controlling the display 142, and acts as an interface between the controller 100 and the display 142. The display driver 144 may be an integrated circuit chip (IC). The robot 12 can be provided with a speaker (not shown) for providing audible notifications to the user. The robot 12 can be provided with one or more cameras 146 and/or stereo cameras 148 for acquiring visible notifications from the user.

In this way, the user can communicate instructions to the robot 12 by gestures. For example, the user can wave their hand in front of the camera 146 to instruct the robot 12 to stop or move away. The user interface 140 can have one or more switches 150 that are actuated by the user to provide input to the controller 100 to control the operation of various components of the robot 12. A switch driver 152 can be provided for controlling the switch 150, and acts as an interface between the controller 100 and the switch 150.

In one embodiment, imagery from one or both of the cameras 146, 148 can be displayed on the smartphone 14, which can facilitate better user control of the robot in the manual mode of operation. For example, if the robot is driven into a hard to see area, such as under, behind, or between furniture, the point-of-view imagery from the robot can be accessed by the user via the smartphone 14 to help the user continue to direct the movement of the robot, even without a line of sight to the robot.

The controller 100 can be operably coupled with various sensors for receiving input about the environment and can use the sensor input to control the operation of the robot 12. The sensor input can be stored in the memory 126 and/or used to develop maps for navigation. Some exemplary sensors are illustrated in FIG. 13, although it is understood that not all sensors shown may be provided, additional sensors not shown may be provided, and that the sensors can be provided in any combination.

The robot 12 can include a positioning or localization system having one or more sensors determining the position of the robot 12 relative to objects. The localization system can include one or more infrared (IR) obstacle sensors 154 and/or stereo cameras 148 for distance and position sensing. The obstacle sensors 154 and/or stereo cameras 148 are mounted to the housing of the autonomous unit, such as in the front of the autonomous unit to determine the distance to obstacles in front of the robot 12. Input from the obstacle sensors 154 and/or stereo cameras 148 can be used to slow down and/or adjust the course of the unit when objects are detected.

Bump sensors 156 can also be provided for determining front or side impacts to the unit. The bump sensors 156 may be integrated with a bumper on the housing of the unit. Output signals from the bump sensors 156 provide inputs to the controller 100 for selecting an obstacle avoidance algorithm.

In addition to the obstacle and bump sensors 154, 156, the localization system can include additional sensors, including a side wall sensor 158, one or more cliff sensors 160, one or more cameras 146, and/or an accelerometer 162. The side wall or wall following sensor 158 can be located near the side of the unit and can include a side-facing optical position sensor that provides distance feedback and controls the unit so that the unit can follow near a wall without contacting the wall. The cliff sensors 160 can be bottom-facing optical position sensors that provide distance feedback and control the unit so that the unit can avoid excessive drops such as stairwells or ledges. In addition to optical sensors, the wall following and cliff sensors 158, 160 can be mechanical or ultrasonic sensors.

The accelerometer 162 is an integrated inertial sensor located on the controller 100 and can be a nine-axis gyroscope or accelerometer to sense linear, rotational and magnetic field acceleration. The accelerometer 162 can use acceleration input data to calculate and communicate change in velocity and pose to the controller 100 for navigating the robot 12 around the surface to be cleaned.

The robot 12 can include one or more lift-up sensors 164, which detect when the unit is lifted off the surface to be cleaned, such as when the user picks up the robot 12. This information is provided as an input to the controller 100, which will halt operation of the pump motor 108, brush motor 112, vacuum motor 118, and/or wheel motors 124. The lift-up sensors 164 may also detect when the unit is in contact with the surface to be cleaned, such as when the user places the robot 12 back on the ground; upon such input, the controller 100 may resume operation of the pump motor 108, brush motor 112, vacuum motor 118, and wheel motors 124.

While not shown, the robot 12 can optionally include one or more sensors for detecting the presence of the supply and recovery tanks 104, 116. For example, one or more pressure sensors for detecting the weight of the supply tank 104 and the recovery tank 116 can be provided. This information is provided as an input to the controller 100, which may prevent operation of the robot 12 until the supply and recovery tanks 104, 116 are properly installed. The controller 100 may also direct the display 142 to provide a notification to the user that the supply tank 104 or recovery tank 116 is missing.

The robot 12 can include one or more floor condition sensors 166 for detecting a condition of the surface to be cleaned. For example, the robot 12 can be provided with an infrared dirt sensor, a stain sensor, an odor sensor, and/or a wet mess sensor. The floor condition sensors 166 provide input to the controller 100 that may direct operation of the robot 12 based on the condition of the surface to be cleaned, such as by selecting or modifying a cleaning cycle. Optionally, the floor condition sensors 166 can also provide input to the smartphone 14 in the manual mode of operation for vibrating the smartphone 114 when dirt or debris is encountered by the cleaning robot 12, as shown for FIG. 10.

As discussed briefly for the system 10 of FIG. 1, an artificial barrier system can also be provided for containing the robot 12 within a user-determined boundary. The artificial barrier system can include an artificial barrier generator 168 that comprises a housing with at least one sonic receiver for receiving a sonic signal from the robot 12 and at least one IR transmitter for emitting an encoded IR beam towards a predetermined direction for a predetermined period of time. The artificial barrier generator 168 can be battery-powered by rechargeable or non-rechargeable batteries. In one embodiment, the sonic receiver can comprise a microphone configured to sense a predetermined threshold sound level, which corresponds with the sound level emitted by the robot when it is within a predetermined distance away from the artificial barrier generator 168. Optionally, the artificial barrier generator 168 can comprise a plurality of IR emitters near the base of the housing configured to emit a plurality of short field IR beams around the base of the artificial barrier generator housing. The artificial barrier generator 168 can be configured to selectively emit one or more IR beams for a predetermined period of time, but only after the microphone senses the threshold sound level, which indicates the robot 12 is nearby. Thus, the artificial barrier generator 168 can conserve power by emitting IR beams only when the robot 12 is near the artificial barrier generator 168.

The robot 12 can have a plurality of IR transceivers 170 around the perimeter of the unit to sense the IR signals emitted from the artificial barrier generator 168 and output corresponding signals to the controller 100, which can adjust drive wheel control parameters to adjust the position of the robot 12 to avoid the boundaries established by the artificial barrier encoded IR beam and the short field IR beams. This prevents the robot 12 from crossing the artificial barrier boundary and/or colliding with the artificial barrier generator housing. The IR transceivers 170 can also be used to guide the robot 12 toward the docking station 18.

In operation, sound emitted from the robot 12 greater than a predetermined threshold sound level is sensed by the microphone and triggers the artificial barrier generator 168 to emit one or more encoded IR beams as described previously for a predetermined period of time. The IR transceivers 170 on the robot 12 sense the IR beams and output signals to the controller 100, which then manipulates the drive system to adjust the position of the robot 12 to avoid the border established by the artificial barrier system while continuing to perform a cleaning operation on the surface to be cleaned. As discussed above, when the cleaning robot 12 is in the manual mode of operation, the artificial barrier may still operate to contain the robot 12 within a predetermined boundary, or the manual mode of operation may override the artificial barrier.

Figure 14:
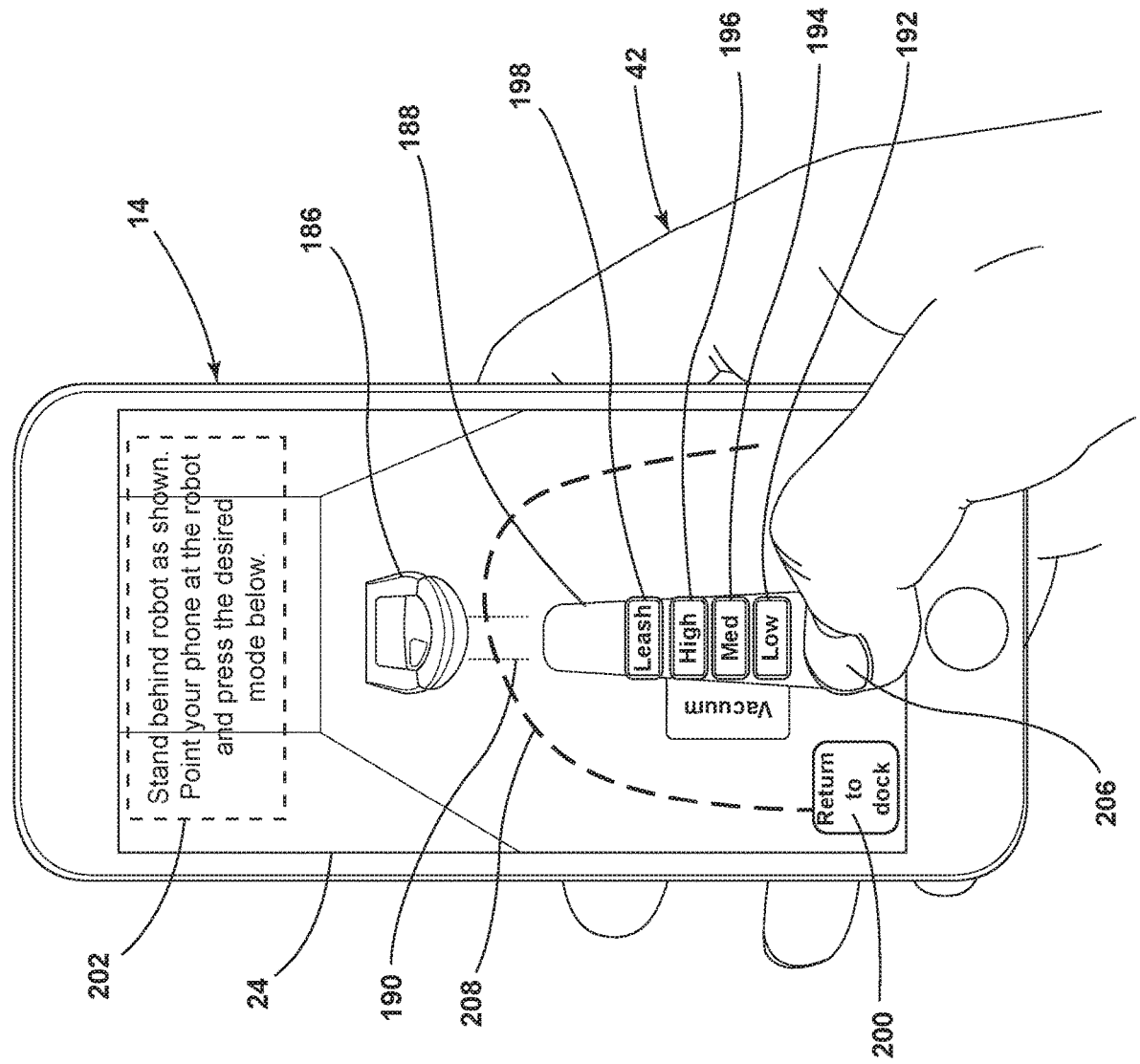
FIG. 14 is a schematic illustration of one embodiment of user interface on a smartphone for the system of FIG. 1.

FIG. 14 shows one embodiment of a user interface for the system 10. The user interface can be a screen of the application on the smartphone 14 shown on the display or touchscreen 24 of the smartphone 14. The user interface can display a representation of the robot 12 and a representation of a handle for a vacuum cleaner, such as a stick handle for a stick vacuum cleaner. In the illustrated embodiment, the representation of the robot 12 comprises a robot icon or graphic 186. The representation of a handle defines a virtual handle 188 for the robot 12, as the robot 12 in reality does not include a handle. The user interface can be configured to provide the user with an experience similar to that of an attended, upright vacuum cleaner, such that a user familiar with operating an attended, upright vacuum cleaner can intuitively operate the user interface to manually control the robot 12.

The robot icon 186 can be a user interface element placed according to a transformation of smartphone pose data into a 2D Cartesian coordinate pair as described above, and can be displayed as oriented to the user. Alternatively or additionally, the representation 62 can be an icon or graphic, a live video feed to the robot 12, and/or one or more augmented reality features.

Lines 190 from the virtual handle 188 to the robot icon 186 can be selectively displayed on the user interface and can indicate when the robot 12 is under direct or manual control of the user via the smartphone 14. When the robot 12 is not under direct control via the smartphone 14, lines 190 are not displayed on the user interface.

The user interface can include one or more virtual buttons for manually controlling the operation of the robot 12. At least one of the virtual buttons can place the robot 12 under direct or manual control of the user via the smartphone 14 and activate at least the vacuum motor 118 (FIG. 13) of the robot 12. Additional components, such as the brush motor 112 and/or the pump 108 in the case of a deep cleaning robot can also be activated by pressing the virtual button. Pressing the virtual button can also fix the relative position of the cleaning robot 12 with respect to the smartphone 14 via a virtual tether.

In the illustrated embodiment, the robot 12 comprises multiple modes of direct or manual control, which can correspond to different vacuum motor speeds for the vacuum motor 118. For example, the vacuum motor 118 can have a low, medium, and high speed mode, with the motor speed being lowest in the low speed mode and highest in the high speed mode, and at an intermediate speed in the medium speed mode. The noise generated by the vacuum motor 118 can also correspondingly differ in each mode, with the low speed mode being the quietest and the high speed mode being the loudest. The user interface can have a virtual button for each speed mode, including, as shown in FIG. 14, a low button 192 for selecting the low speed mode, a medium button 194 for selecting the medium speed mode, and a high button 196 for selecting the high speed mode. The buttons 192-196 can optionally be displayed as physical buttons on the virtual handle 188.

Selection of one of the virtual buttons 192, 194, 196 places the robot 12 under direct or manual control of the user via the smartphone 14 and activate at least the vacuum motor 118 (FIG. 13) of the robot 12, with the speed of the vacuum motor 118 being set to a predetermined low, medium or high speed corresponding to the selection of the low, medium, or high button 192, 194, 196. Optionally, additional components, such as the brush motor 112 and/or the pump 108 in the case of a deep cleaning robot can also be activated by pressing the virtual button 192, 194, 196.

The user interface can include a leash button 198 that initiates a leash mode and fixes the relative position of the cleaning robot 12 with respect to the smartphone 14, including the distance between the smartphone 14 and the robot 12, by way of the IMU 30 (FIG. 1). The user can press the leash button 198 once to activate the robot 12 and fix the relative position of the cleaning robot 12 with respect to the smartphone 14 via a virtual tether, and press the leash button 198 again to release the virtual tether. Pressing the leash button 198 can activate the drive system of the robot 12, but does not activate or can deactivate at least the vacuum motor 118 (FIG. 13), and optionally does not activate or can deactivate the brush motor 112. In the case of a deep cleaning robot, pressing the leash button 198 also does not activate or can deactivate the pump 108. Using the virtual tether or leash mode, the user can manually direct the robot 12 to move to a desired location, while not performing cleaning. The leash button 198 can optionally be displayed as a physical button on the virtual handle 188.

The user interface can include a return to dock button 200 which can be selected by the user to send the robot 12 to the docking station 18 (FIG. 1). Pressing the return to dock button 200 can deactivate one or more components of the robot 12, such as the vacuum motor 118, brush motor 112, and/or pump 108 (FIG. 13), and control the drive system, including the wheel motors 124, to automatically send the robot 12 back to the docking station 18, i.e. without requiring manual input or direction control by the user. In one example, the IR transceivers 170 can be used to guide the robot 12 toward the docking station 18. The return to dock button 200 can optionally be displayed outside the virtual handle 188 on the touchscreen 24. Spacing the return to dock button 200 from the virtual handle 188 can prevent a user from inadvertently sending the robot 12 back to the docking station 18 during a manual operation.

The user interface can include at least one user prompt 202 in the form of a text message or a symbol displayed on the touchscreen 24. The user prompt 202 can indicate that the system 10, robot 12, smartphone 14, and/or application executed by the smartphone 14 is ready for user instructions, and/or can provide information or tips on how to operate the system 10, robot 12, smartphone 14, and/or application executed by the smartphone 14, and/or can provide status information for system 10, robot 12, smartphone 14, and/or application executed by the smartphone 14. In the example shown, the user prompt 202 instructs the user where to stand relative to the robot 12, where to hold the smartphone 14 in relation to the robot 12, and how to use the user interface to control the robot 12. Other use prompts 202 are possible.

In one embodiment, imagery from one or both of the cameras 146, 148 (FIG. 13) can be displayed on the touchscreen 24. For example, if the robot is driven into a hard to see area, such as under, behind, or between furniture, the point-of-view imagery from the robot can be accessed by the user via the smartphone 14 to help the user continue to direct the movement of the robot 12, even without a line of sight to the robot 12.

In operation, a user positions themselves behind the cleaning robot 12, or in some other predefined relative orientation, and holds the smartphone 14 toward the cleaning robot 12, such as by holding the smartphone in one hand 42. The user presses and holds one of the four buttons 192-198 on the virtual handle 188 of the user interface to lock onto the robot 12, such as by pressing one of the four buttons 192-198 with a thumb 206 of the hand 42 holding the smartphone for one-handed operation, or with a finger of their other hand (not shown) for two-handed operation. The user interface can be configured such that the user holds the virtual button 192-198 to maintain the manual mode of operation, or such that the user can release the virtual button 192-198 and simply move the smartphone 14 to direct the movement of the cleaning robot 12. In the case of the latter, pressing the virtual button 192-198 a second time can stop or pause the manual mode of operation, including stopping the movement of the robot 12 and deactivating at least the vacuum motor 118, and optionally also the brush motor 112 and/or the pump 108.

Optionally, if the robot 12 is in an error state or condition where the virtual handle mode cannot be used, the buttons 192-200 can be greyed out and/or the user prompt 202 can indicate to the user that the virtual handle mode cannot be used. The user prompt 202 can optionally indicate why the virtual handle mode cannot be used and/or how to correct the error state or condition of the robot 12 in order to use the virtual handle mode.

The buttons 192-200 on the user interface can be provided within a zone 208 on the touchscreen 24 configured to facilitate one-handed operation by the user while holding the smartphone 14 in one hand 42. Optionally, the zone 208 can be in a bottom half of the touchscreen 24 and/or in the middle of the touchscreen 24 to allow one-handed operation by the user while holding the smartphone 14 in either their left hand or right hand.

During the manual mode of operation, i.e. the virtual handle mode, the smartphone 14 can be configured to provide the user with an alert in reaction to one or more events. The alert can be an indication or representation useful for alerting or informing the user of one of more events, and can include, but is not limited to, haptic feedback, an audible indication, and/or a visual indication on the display 24, such as an augmented reality display. An event can be determined based on input from one or more of the various sensors, shown in FIG. 13, on the robot 12 for receiving input about the environment, including the camera 146, stereo cameras 148, obstacle sensors 154, bump sensors 156, side wall sensor 158, cliff sensors 160, accelerometer 162, lift-up sensors 164, and/or floor condition sensors 166.

In one example, the smartphone 14 can vibrate in reaction to one or more events detected by one or more of the sensors of the robot 12. The vibration pattern can differ based on the detected event. For example, the smartphone 114 can provide a single hard vibration in response to an impact or an excessive drop detected by the bump sensors 156 or cliff sensors 160, and can provide a softer vibration in response to an obstacle being within a predetermined distance, as detected by the obstacle sensors 154 and/or stereo cameras 148.

Figure 15:
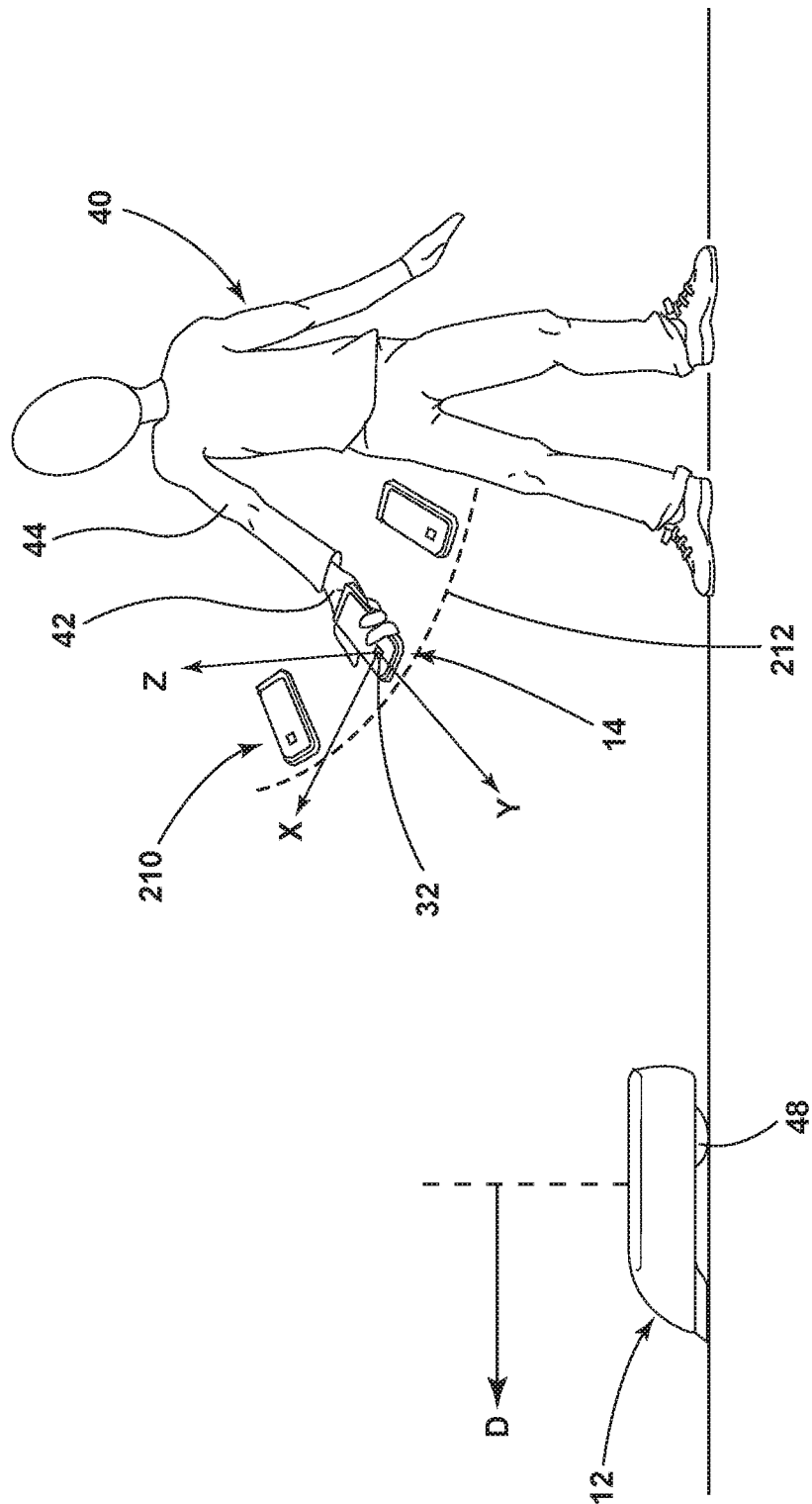
FIG. 15 is a schematic illustration of a first user gesture for controlling a movement of a robot.

FIG. 15 illustrates a first user gesture 210 for controlling a straight translation movement of the robot 12. The first user gesture 210 is described with reference to the frame of reference for the smartphone 14 described for FIG. 3, the frame of reference for the robot 12 described for FIG. 4, and the translation function described for FIG. 5, although it is understood that the first user gesture 210 can be applied with other embodiments of reference frames and functions.

Performance of the first user gesture 210 accelerates the smartphone 14, and the acceleration can be detected as previously described herein, such as by the IMU 30. The smartphone processor 29 executes a move algorithm or software code that transforms the detected acceleration of the smartphone 14 into movement instructions executable by a controller 50 of the robot 12.

The first user gesture 210 can be a swinging gesture defined as a swinging movement of the arm 44 holding the smartphone 14 to move the smartphone 14 in an arc 212 in plane Y-Z. Movement of the arm 44 in the arc 212 away from the user 40 can drive the robot 12 forward along drive axis D. Movement of the arm 44 in the arc 212 toward the user 40 can drive the robot 12 backward along drive axis D. The acceleration and velocity of the robot 12 can depend on the acceleration and velocity of the smartphone 14 through the arc 212, as can be determined by the smartphone accelerometer 32. For example, moving the smartphone 14 faster or slower through the arc 212 will accordingly move the robot 12 faster or slower. The move algorithm or software code executed by the smartphone 14 can have a scaling factor, such as a linear amplification factor, applied to the acceleration and velocity of the smartphone 14. For example, the robot velocity can optionally be at least 1.2 times, at least 1.5 times, or at least 2.0 times the velocity of the smartphone 15. The smartphone 14 can apply a fast filter function, such as an averaging filter, to the mobile IMU acceleration and velocity to achieve smooth motion of the robot 12.

The first user gesture 210 can be dependent on an established virtual tether distance between the smartphone 14 and the robot 12. Once leashed, for example by pressing one of the virtual buttons 192-198 on the user interface shown in FIG. 14, the user 40 can swing their arm 44 back-and-forth, changing the tilt angle of the smartphone 14 as it moves in the arc 212. The move algorithm can resolve the acceleration and velocity using the tilt angle to the frame of reference of the robot 12, and the robot 12 can accordingly move forward and backward along drive axis D, maintaining the fixed distance between the robot 12 and the smartphone 14. The distance the robot 12 moves forward or backward can depend on the arc length of the arc 212, which can vary from swing-to-swing as performed by the user 40.

The user 40 can remain in one place or be in motion, i.e. walking around, while performing the first user gesture 210. For example, the user 40 can optionally swing the arm 44 holding the smartphone 14 back and forth while walking around to move the robot 12 forward and backward accordingly, while maintaining the fixed distance between the robot 12 and the smartphone 14 established via the virtual tether. In this way, the user 40 can emulate the action of using an upright or stick vacuum cleaner with a rigid handle.

Figure 16:
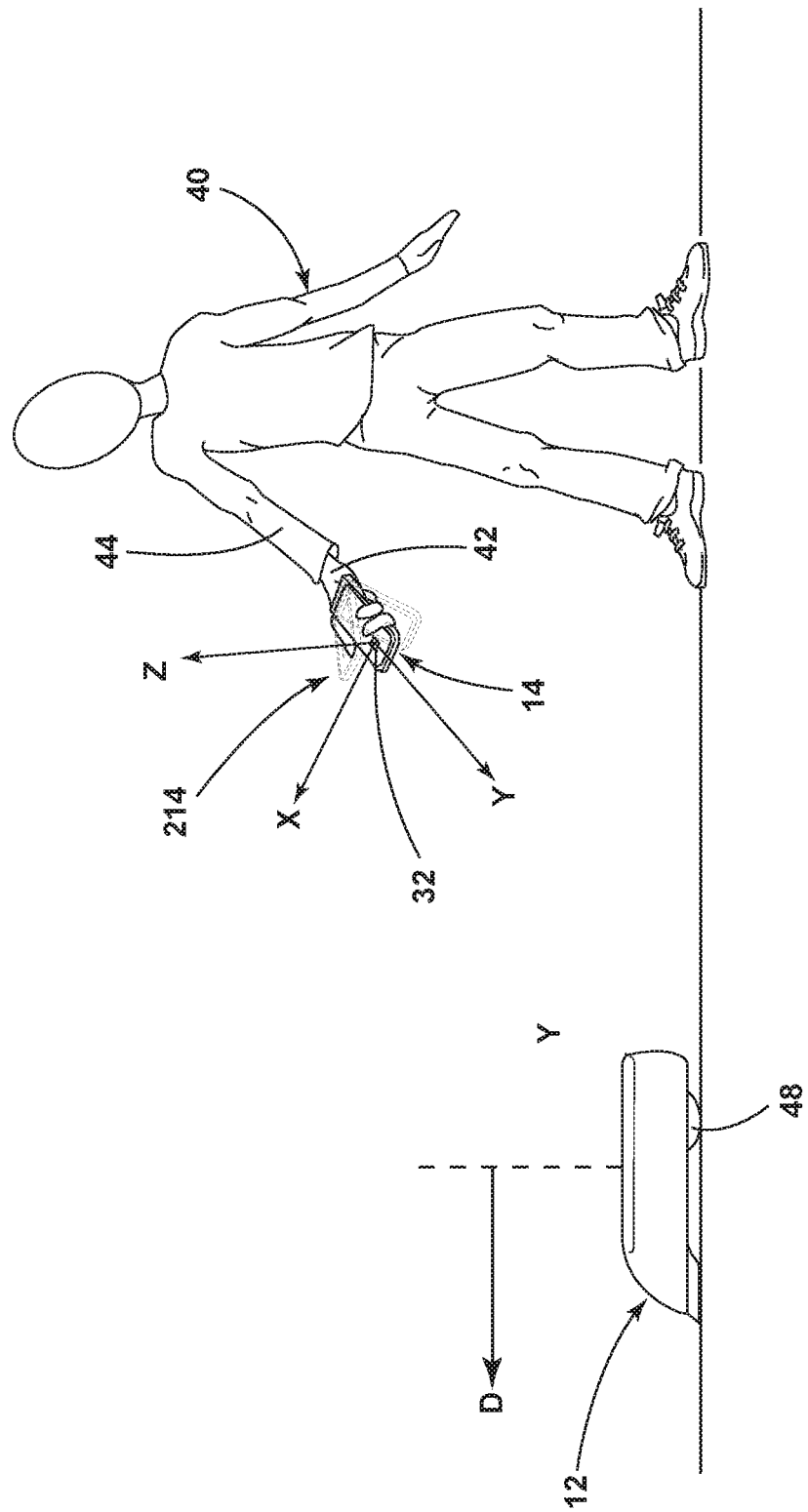
FIG. 16 is a schematic illustration of a second user gesture for controlling a movement of a robot.

FIG. 16 illustrates a second user gesture 214 for controlling a straight translation movement of the robot 12. The second user gesture 214 is described with reference to the frame of reference for the smartphone 14 described for FIG.

3, the frame of reference for the robot 12 described for FIG. 4, and the translation function described for FIG. 5, although it is understood that the second user gesture 214 can be applied with other embodiments of reference frames and functions. The second user gesture 214 can be an alternative to the first user gesture 210 for the translation function, in which the pitch of the smartphone 14 is transformed into the velocity of the robot 12.

Performance of the second user gesture 214 accelerates the smartphone 14, and the acceleration can be detected as previously described herein, such as by the IMU 30. The smartphone processor 29 executes a move algorithm or software code that transforms the detected acceleration of the smartphone 14 into movement instructions executable by a controller 50 of the robot 12.

The second user gesture 214 can be a tilt gesture defined as a front-to-back tilting movement of the hand 42 holding the smartphone 14 to rotate the smartphone 14 about the axis X, as detected by the smartphone accelerometer 32, with minimal back-and-forth swinging within the plane Y-Z, i.e. the movement is performed at the write of the hand 42, while the arm 44 of that hand 42, including the elbow and shoulder, substantially does not move or is kept substantially still within the plane Y-Z. This achieves a change in pitch of the smartphone 14 without substantial translation. Movement of the wrist to tilt the smartphone upward can drive the robot 12 forward along drive axis D. Movement of the wrist to tilt the smartphone 14 downward can drive the robot 12 backward along drive axis D. The second user gesture 214 can be used to extend the robot path under a couch or other area that cannot be accessed with a normal operating virtual tether distance. The user 40 can remain in one place or be in motion, i.e. walking around, while performing the second user gesture 214.

In an embodiment of the second user gesture 214 where a scaling factor is applied to the accelerometer 32 to get proportional movement from the user's perspective, the scaling factor can be a function of the pose of the smartphone 14. For example, the scaling factor can be increased when the smartphone 14 is tilted upward and decreased when the smartphone 14 is tilted downward.

Figure 17:
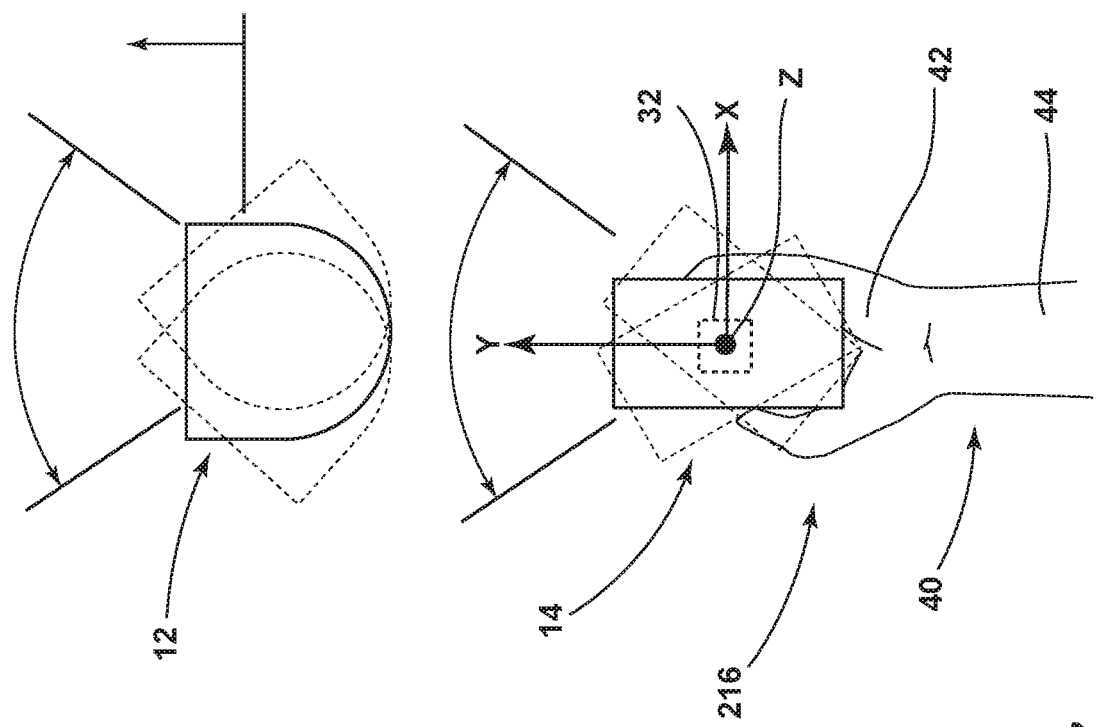
FIG. 17 is a schematic illustration of a third user gesture for controlling a movement of a robot.

FIG. 17 illustrates a third user gesture 216 for controlling rotational or turning movement of the robot 12. The third user gesture 216 is described with reference to the frame of reference for the smartphone 14 described for FIG. 3, the frame of reference for the robot 12 described for FIG. 4, and the turning function described for FIG. 6, although it is understood that the third user gesture 216 can be applied with other embodiments of reference frames and functions.

Performance of the third user gesture 216 accelerates the smartphone 14, and the acceleration can be detected as previously described herein, such as by the IMU 30. The smartphone processor 29 execute a move algorithm or software code that transforms the detected acceleration of the smartphone 14 into movement instructions executable by a controller 50 of the robot 12.

The third user gesture 216 can be a turning gesture defined as a turning movement of the hand 42 holding the smartphone 14 to rotate the smartphone about axis Z, as detected by the smartphone accelerometer 32. The third user gesture 216 can be dependent on an established virtual tether between the smartphone 14 and the robot 12. Once leashed, for example by pressing one of the virtual buttons 192-198 on the user interface shown in FIG. 14, the user 40 can turn their hand 42 left or right, from the perspective of the user 40, changing the yaw of the smartphone 14 as it rotates about axis Z. Any rotation of the smartphone 14 after the user presses one of the virtual buttons 192-198 can result in a similar rotation or turning of the robot 12. The move algorithm can resolve the yaw to the frame of reference of the robot 12, and the robot 12 can accordingly turn left or right. The user 40 can remain in one place or be in motion, i.e. walking around, while performing the third user gesture 216.

The third user gesture 216 and be performed in parallel or in sequence with the first user gesture 210. A combination of the third user gesture 216 and the first user gesture 210 by rotation of the smartphone 14 at the same time as the back-and-forth swinging of the smartphone 14 can accordingly cause the robot 12 to make a forward right turn, a forward left turn, a backward right turn, or a backward left turn, with the acceleration, velocity, direction, and radius of curvature of movement being determined in accordance with the user's gesture.

Optionally, the second user gesture 214 is not combinable with the third user gesture 216, such that the robot 12 cannot be turned at the same time the robot 12 is translated under a couch or other area that cannot be accessed with a normal operating virtual tether distance. In operation, the move algorithm can recognize only one of the two gestures 214, 216 at a time, and can base the determination of which gesture is recognized by whichever pose signal, i.e. pitch vs. yaw, is greater above a baseline noise filter.

In one embodiment, the robot 12 does not compensate for the actual position of the smartphone 14 relative to the robot 12 after the robot 12 turns. After a turn, the user can reposition themselves behind the robot 12 again, and press one of the virtual buttons 192-198 on the user interface shown in FIG. 14 to reestablish the virtual tether between the smartphone 14 and the robot 12.

Performing any of the user gestures 210, 214, 216 described herein in the leash mode, i.e. the leash button 198 on the user interface (FIG. 14) pressed, can apply the associated motion to the robot 12, but one or more components of the robot 12, such as the vacuum motor 118 (FIG. 13), is turned off. Optionally, the user gestures 210, 214, 216 described herein are not recognized if performed in parallel with or after pressing the return to dock button 200 on the user interface (FIG. 14).

Figure 18:
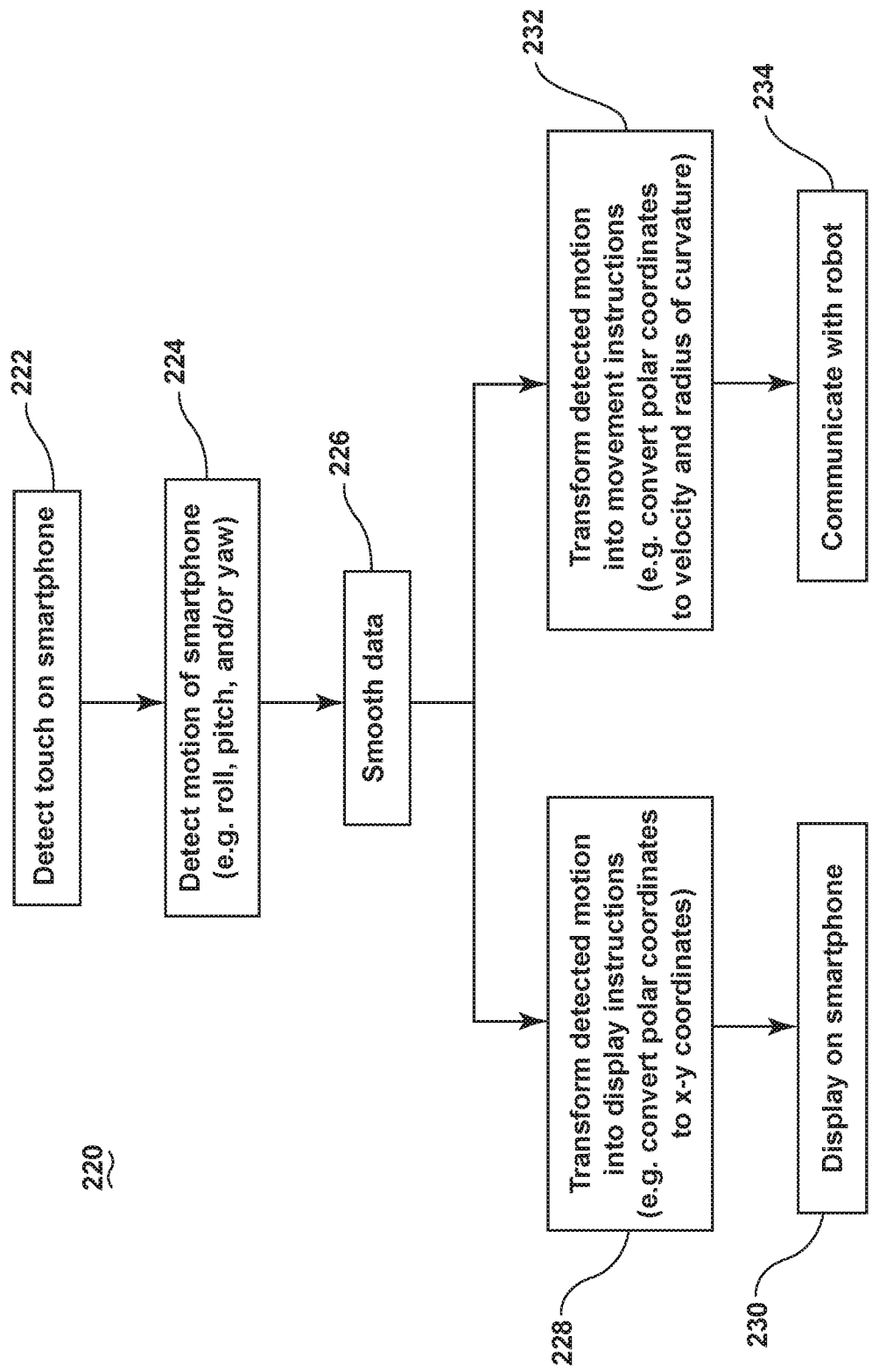
FIG. 18 is a process flow chart showing a method of manually controlling an autonomous floor cleaner according to one embodiment of the invention.

One embodiment of a method for manually controlling an autonomous floor cleaner is illustrated in FIG. 18 and generally designated 220. The sequence of steps discussed is for illustrative purposes only and is not meant to limit the method in any way as it is understood that the steps may be performed sequentially or in parallel, and may proceed in a different logical order, that additional or intervening steps may be included, and/or that described steps may be divided into multiple steps, without detracting from the invention. The method 220 is described with respect to the various embodiments of the system 10 described herein, although it is understood that the method 220 is not limited to the particular embodiments described herein.

The method 220 begins with detecting a touch on the touchscreen display 24 of the smartphone 14 at step 222. The detection of a touch can include determining the location of the touch on the display 24, and sending this location to the processor 29. Optionally, the touch detected can be a single or multi-touch gesture by the user.

In one example, the user 40 can press one of the virtual buttons 26 (FIG. 1) or 192-198 (FIG. 14), and the detection of a touch can include determining that the touch corresponds to the location of the virtual button 26 on the touchscreen display 24.

Upon the detection of the touch on the touchscreen display 24, the cleaning robot 12 can be activated, and the relative position of the robot 12 with respect to the smartphone 14 can be fixed. Activation of the cleaning robot 12 can include activating at least one component of the robot 12, such as the suction source or vacuum motor 118 (FIG. 13), the brush motor 112 and/or the pump 108 in the case of a deep cleaning robot.

Activation of the robot 12 by a touch on the touchscreen display 24 of the smartphone 14 may be preferred over activation of the robot 12 by a user gesture detected by the smartphone 14, as this can prevent a user from unintentionally activating the robot 12 by making a gesture that is interpreted as an activation gesture. In an embodiment where touch input is detected on the application executed by the smartphone 14, the application must be open on the smartphone 14 and touch input must be detected before the robot 14 is activated.

Next, at step 224, motion of the smartphone 14 can be detected. The detected motion of the smartphone 14 can represent a gesture by the user 40 holding the smartphone 14. Specifically, acceleration of the smartphone 14, and/or other orientation or pose data, can be detected or sensed, such as by the inertial measurement unit (IMU) 30, and specifically the accelerometer 32, or a tilt sensor. In one example, the detected acceleration can be provided as data that represents the pose (e.g. roll, pitch, and yaw) of the smartphone 14.

Optionally, depending upon the fidelity of the motion data, one or more data smoothing operations can be performed at step 226. Examples of data smooth operations include, but are not limited to, low pass filtering, noise filtering, averaging filtering, fast filtering, band pass filtering, etc.

At 228, the detected motion of the smartphone 14 can be indicated or conveyed to the user 40 on the display 24 of the smartphone 14. More specifically, the detected motion can be transformed into display instructions for a user interface, or a user interface element, that is displayable on the display 24 of the smartphone 14. The transformation can comprise executing a display algorithm or software code by the smartphone processor 29. The display algorithm or software code can include converting polar coordinates into an x and y coordinate to indicate a point in a 2D Cartesian coordinate frame, as described in more detail above.

The user interface, or user interface element, is displayed on the smartphone 14 at step 230. The displaying can comprise displaying a representation of the robot 12 on the touchscreen display 24 of the smartphone. The displaying can comprise displaying a representation of a vacuum cleaner handle, an example of which is designated 188 in FIG. 14. The displaying can comprise displaying an indication that the robot 12 is under direct or manual control of the user 40 via the smartphone 14. An example of such an indication is the lines 190 in FIG. 14.

At step 232, the detected motion of the smartphone 14 is transformed into corresponding movement of the cleaning robot 12. More specifically, the detected motion can be transformed into movement instructions executable by the robot controller 50. The transformation can comprise executing a move algorithm or software code by the smartphone processor 29 or by the robot controller 50. The move algorithm or software code can include converting polar coordinates into velocity and radius of curvature values, or accessing a lookup table, as described in more detail above.

The movement instructions are communicated with the robot 12 at step 234. The communication can comprise providing a control command or other communication to the controller 50 of the robot 12. The smartphone 14 can wirelessly communicate the movement instructions with the cleaning robot 12 using any suitable wireless technology, such as Bluetooth® or Wi-Fi™. As such, the method 220 may further include establishing a wireless connection between the smartphone 14 and the robot 12. This wireless connection can be established prior to, in parallel with, or after the touch detection at step 222.

The robot 12 can execute the communicated movement instructions, such as by controlling the drive system to move the robot 12 over the floor surface based on the movement instructions. During this execution, the relative position of the robot 12 with respect to the smartphone 14 is fixed.

During the manual mode of operation, the robot 12 can override the movement instructions in reaction to an event. An event can be determined based on input from one or more of the various sensors, shown in FIG. 13, on the robot 12 for receiving input about the environment, including the cameras 146, 148, obstacle sensors 154, bump sensors 156, side wall sensor 158, cliff sensors 160, accelerometer 162, lift-up sensors 164, and/or floor condition sensors 166. The positioning or localization system of the robot 12 can prevent the robot 12 from being driven into obstacles or off excessive drops such as stairwells or ledges.

There are several advantages of the present disclosure arising from the various features of the apparatus, systems, and methods described herein. For example, the embodiments of the invention described above provides selective manual control of an autonomous cleaning robot. Previously, users needed both a manual vacuum cleaner and an autonomous vacuum cleaner to take advantage of the benefits of manual and automated cleaning. The present invention provides one floor cleaner that is both automated and manual. This eliminates the need for two floor cleaning apparatus to completely clean. A user can direct the robot over to a spot or area that needs cleaning, rather than having to hope the robot eventually reaches that spot on its own, or having to physically carry the robot to the spot. The present invention is also useful for returning the robot to a location near the docking station to make sure it finds the docking station.

Another advantage of some embodiments of the present disclosure is that the system can leverage an existing device already in possession of the user to manually control the robot, such as the user's phone. By downloading a control application, the user's phone is capable of selectively manually controlling the autonomous cleaning robot. User-directed motion of the robot can be easier to control via the user's phone, in comparison to prior art remote controls for robots having physical buttons, a keyboard, a mouse, or a joystick.

Yet another advantage of some embodiments of the present disclosure is that the compact size of the robot allows the user to direct the robot into areas that would normally be difficult to reach with a conventional upright vacuum cleaner or other manual vacuum cleaner. Embodiments of this system can also provide a very interactive cleaning experience where the robot tracks the area that has been cleaned and alerts the user to areas the robot has not yet cleaned.

While the invention has been specifically described in connection with certain specific embodiments thereof, it is to be understood that this is by way of illustration and not of limitation. Reasonable variation and modification are possible with the scope of the foregoing disclosure and drawings without departing from the spirit of the invention which, is defined in the appended claims. Hence, specific dimensions and other physical characteristics relating to the embodiments disclosed herein are not to be considered as limiting, unless the claims expressly state otherwise.

What is claimed is:

1. A method for manually controlling an autonomous floor cleaner, comprising:
    wirelessly connecting a smartphone to an autonomous floor cleaner comprising an autonomously moveable housing, a controller carried by the housing, a drive system, and an airflow path through the autonomously moveable housing comprising an air inlet and an air outlet, a suction nozzle positioned to confront a floor surface and defining the air inlet, a collection chamber, and a suction source for generating a working air stream through the airflow path;
    selecting a user-determined boundary of the floor surface;
    detecting a touch on a touchscreen display of the smartphone;
    fixing the relative position of the autonomous floor cleaner with respect to the smartphone via a virtual tether upon the detection of the touch on the touchscreen display;
    activating the suction source of the autonomous floor cleaner upon the detection of the touch on the touchscreen display;
    detecting acceleration of the smartphone representing a gesture by a user holding the smartphone, wherein detecting acceleration of the smartphone comprises detecting a pose of the smartphone, wherein detecting acceleration includes detecting a first acceleration of the smartphone in a direction away from the user and detecting a second acceleration of the smartphone representing the user directing the autonomous floor to initially extend away from the smartphone then return;
    transforming the detected acceleration of the smartphone into movement instructions, including transforming the detected acceleration of the smartphone into movement instructions that emulate a handle to an upright vacuum cleaner wherein interaction between the smartphone and the autonomous floor cleaner automatically relaxes such that the virtual tether stretches to enhance coverage area of the autonomous floor cleaner;
    adjusting the movement instructions in response to the user-determined boundary of the floor surface;
    executing the movement instructions by the controller and driving the autonomous floor cleaner over the floor surface, while simultaneously maintaining the fixed relative position of the autonomous floor cleaner with respect to the smartphone via the virtual tether and respecting the user-determined boundary of the floor surface.

2. The method of claim 1, comprising displaying a virtual button on the touchscreen display of the smartphone, wherein detecting the touch on the touchscreen display comprises detecting a touch at a location on the touchscreen display corresponding to the virtual button.

3. The method of claim 1, comprising activating at least one of a brush motor or a pump of the autonomous floor cleaner upon the detection of the touch on the touchscreen display.

4. The method of claim 1, comprising overriding the movement instructions based on input from at least one sensor onboard the autonomous floor cleaner.

5. The method of claim 4, wherein the at least one sensor comprises a camera, a stereo camera, an obstacle sensor, a bump sensor, a side wall sensor, a cliff sensor, an accelerometer, a lift-up sensor, and/or a floor condition sensor.

6. The method of claim 1, comprising performing a data smoothing operation on the data representing the pose of the smartphone prior to transforming the data into the movement instructions.

7. The method of claim 1, comprising:
    transforming the data representing the pose of the smartphone into display instructions for a user interface of the touchscreen display of the smartphone, wherein the display instructions comprises instructions to display a representation of the autonomous floor cleaner and instructions to display a representation of a vacuum cleaner handle;
    executing the display instructions on the smartphone; and
    displaying the user interface on the touchscreen display of the smartphone.

8. The method of claim 1, wherein transforming the detected acceleration of the smartphone into movement instructions comprises applying a scaling factor to the detected first acceleration and the detected second acceleration.

9. The method of claim 1, comprising wirelessly communicating the movement instructions from the smartphone to the controller of the autonomous floor cleaner.

10. The method of claim 1, comprising:
    transforming the detected acceleration of the smartphone, including the first acceleration and the second acceleration, into display instructions for a user interface of the touchscreen display of the smartphone;
    executing the display instructions on the smartphone; and
    displaying the user interface on the touchscreen display of the smartphone.

11. The method of claim 10, wherein the display instructions comprises instructions to display a representation of a vacuum cleaner handle.

12. The method of claim 10, wherein transforming the detected acceleration, including the first acceleration and the second acceleration, comprises executing a display algorithm by a processor of the smartphone, and converting the data representing the pose of the smartphone into 2D Cartesian coordinates, and wherein the display instructions comprise instructions to place an indicia of the autonomous floor cleaner on the touchscreen display of the smartphone at a location corresponding to the 2D Cartesian coordinates.

13. The method of claim 10, comprising performing a data smoothing operation on the data representing the pose of the smartphone prior to transforming the data into the display instructions.

14. The method of claim 1, comprising:
    displaying a first virtual button on the touchscreen display of the smartphone corresponding to a first motor speed for the suction source;
    displaying a second virtual button on the touchscreen display of the smartphone corresponding to a second motor speed for the suction source;
    wherein detecting the touch on the touchscreen display comprises detecting a touch at a location on the touchscreen display corresponding to the first virtual button or the second virtual button; and
    wherein activating the suction source comprises operating the suction source at the first motor speed upon detection of the touch at a location corresponding to the first virtual button, or operating the suction source at the second motor speed upon detection of the touch at a location corresponding to the second virtual button.

15. The method of claim 1, comprising:
- detecting a predetermined user gesture by a user holding the smartphone;
- unfixing the relative position of the autonomous floor cleaner with respect to the smartphone upon the detecting the predetermined user gesture; and
- executing movement instructions by the controller to control the drive system and move the autonomous floor cleaner over the floor surface based on the predetermined user gesture.

16. The method of claim 1, wherein executing the movement instructions by the controller and driving the autonomous floor cleaner over the floor surface includes simultaneously maintaining the fixed relative position of the autonomous floor cleaner with respect to the smartphone via the virtual tether and avoiding the user-selected boundary of the floor surface.

17. The method of claim 1, wherein executing the movement instructions by the controller and driving the autonomous floor cleaner over the floor surface includes simultaneously maintaining the fixed relative position of the autonomous floor cleaner with respect to the smartphone via the virtual tether and staying contained within the user-selected boundary of the floor surface.

18. The method of claim 1, including receiving override user input on the smartphone and in response to the override user input overriding the adjustments to the movement instructions by executing the movement instructions without regard for the user-selected boundary of the floor surface.

19. The method of claim 1, including generating haptic feedback in response to a determination that executing the movement instructions while simultaneously maintaining the fixed relative position of the autonomous floor cleaner with respect to the smartphone via the virtual tether will cause the autonomous floor cleaner to cross the user-defined boundary of the floor surface.

20. The method of claim 1 wherein detecting acceleration includes at least one of detecting the second acceleration of the smartphone in a direction opposite the direction of the first acceleration and detecting a decrease in acceleration of the smartphone in the direction of the first acceleration.

* * * * *